US010244235B2

(12) United States Patent
Merkle et al.

(10) Patent No.: US 10,244,235 B2
(45) Date of Patent: Mar. 26, 2019

(54) WEDGELET-BASED CODING CONCEPT

(71) Applicant: GE Video Compression, LLC, Albany, NY (US)

(72) Inventors: Philipp Merkle, Berlin (DE); Detlev Marpe, Berlin (DE); Karsten Mueller, Berlin (DE)

(73) Assignee: GE Video Compression, LLC, Albany, NY (US)

( * ) Notice: Subject to any disclaimer, the term of this patent is extended or adjusted under 35 U.S.C. 154(b) by 141 days.

(21) Appl. No.: 15/198,029

(22) Filed: Jun. 30, 2016

(65) Prior Publication Data

US 2016/0309153 A1 Oct. 20, 2016

Related U.S. Application Data

(63) Continuation of application No. PCT/EP2014/079479, filed on Dec. 30, 2014.

(30) Foreign Application Priority Data

Jan. 3, 2014 (EP) .................................. 14150179

(51) Int. Cl.
*H04N 19/13* (2014.01)
*H04N 19/463* (2014.01)
(Continued)

(52) U.S. Cl.
CPC ........... *H04N 19/13* (2014.11); *H04N 19/119* (2014.11); *H04N 19/176* (2014.11); *H04N 19/463* (2014.11); *H04N 19/91* (2014.11)

(58) Field of Classification Search
CPC .... H04N 19/13; H04N 19/176; H04N 19/463; H04N 19/91
USPC ......................................................... 375/240
See application file for complete search history.

(56) References Cited

U.S. PATENT DOCUMENTS

2010/0127904 A1* 5/2010 Oxman ................... H03M 7/40
341/107
2013/0223511 A1* 8/2013 Amon ..................... H04N 7/152
375/240.02
(Continued)

FOREIGN PATENT DOCUMENTS

CN 102740066 A 10/2012
JP H09-98433 A 8/1997
(Continued)

OTHER PUBLICATIONS

Office Action dated Nov. 14, 2017 in Korean Application 10-2016-7021145.
(Continued)

*Primary Examiner* — Zaihan Jiang
(74) *Attorney, Agent, or Firm* — Pillsbury Winthrop Shaw Pittman, LLP

(57) ABSTRACT

Wedgelet-based coding in conjunction with the usage of coding blocks of varying size is rendered more efficient by the usage of a variable length coded syntax element having a prefix and a suffix, wherein the size of the suffix is dependent on the prefix and the size of the current coding block. By this measure, it is feasible to efficiently adapt the length of the variable-length coded syntax element which controls the bi-partitioning of the current coding block to the actual needs, namely the size, of the current coding block, and the variability of the bi-partitioning by varying the wedgelet separation line, respectively. The greater the current coding block is, the longer the variable-length coded syntax element may be. This length dependency may even be sufficiently effective in terms of coding efficiency so that the variable length coded syntax element may be coded without context-adaptive entropy coding, but directly or using fixed-equal-probability binary entropy coding.

22 Claims, 9 Drawing Sheets

(51) Int. Cl.
*H04N 19/91* (2014.01)
*H04N 19/176* (2014.01)
*H04N 19/119* (2014.01)

(56) References Cited

U.S. PATENT DOCUMENTS

| | | | | |
|---|---|---|---|---|
| 2013/0272389 | A1* | 10/2013 | Sze | H04N 19/91 375/240.03 |
| 2014/0294061 | A1* | 10/2014 | Zhang | H04N 19/597 375/240.02 |
| 2015/0092840 | A1* | 4/2015 | Mochizuki | H04N 19/593 375/240.03 |
| 2016/0073131 | A1* | 3/2016 | Heo | H04N 19/597 348/43 |
| 2016/0241835 | A1* | 8/2016 | Ikai | H04N 19/70 |
| 2016/0330479 | A1* | 11/2016 | Liu | H04N 19/597 |
| 2016/0330480 | A1* | 11/2016 | Liu | H04N 13/0048 |
| 2017/0155908 | A1* | 6/2017 | Gu | H04N 19/13 |
| 2017/0318313 | A1 | 11/2017 | Merkle et al. | |

FOREIGN PATENT DOCUMENTS

| | | |
|---|---|---|
| KR | 101151352 B1 | 6/2012 |
| WO | 2013/068564 A1 | 5/2013 |
| WO | 2013068567 A1 | 5/2013 |

OTHER PUBLICATIONS

Liu, H., "Description of core Experiment 5 (CE5) on Depth Intra Modes", 6th JCT-3V Meeting, Geneva, 2013, JCT3V-F1105, 3 pages.

Rusanovskyy, D., et al., "Common Test Conditions of 3DV Core Experiments", 6th JCT-3V Meeting, Geneva, 2013 JCT3V-F1100, 7 pages.

Tech, G., et al., "3D-HEVC Draft Text 2", 6th JCT-3V Meeting, Geneva, 2013, JCT3V-F1001-v4, 94 pages.

Oscar Divorra Escoda, P.Y., et al., "Geometry-Adaptive Block Partitioning for Video Coding", Proc. IEEE ICASSP, Honolulu, 2007, pp. I657-I660, 4 pages.

Marpe, D., et al., "Context-Based Adaptive Binary Arithmetic Coding in the H.264/AVC Video Compression Standard" IEEE Trans. Circuits Syst. Video Technol., 2003, vol. 13, No. 7, pp. 620-636, 17 pages.

Decision to Grant dated Aug. 1, 2017 in Japanese Application 2016-544391.

Notification of the First Office Action Chinese Patent Application No. 2014800767543 dated Jul. 3, 2018 with English translation.

* cited by examiner

WEDGELET-BASED CODING CONCEPT

CROSS-REFERENCE TO RELATED APPLICATIONS

This application is a continuation of co-pending International Application No. PCT/EP2014/079479, filed Dec. 30, 2014, and additionally claims priority from European Application No. EP 14150179.1, filed Jan. 3, 2014, which are incorporated herein by reference in their entirety.

The present application is concerned with a wedgelet-based coding concept.

BACKGROUND OF THE INVENTION

In the field of video coding, especially in the field of coding of depth maps, one known block coding type is wedgelet-based coding. According to wedgelet-based coding, a certain coding block is bi-partitioned into two halves, called wedgelets, along a wedgelet-separation line which may, for instance, be a straight line with a certain slope and a certain offset. Different implementations have been described so far, but there is an ongoing need to further reduce the side information useful for the wedgelet-based bi-partitioning. In particular, the position of the wedgelet separation line needs to be shared among encoder and decoder along with, optionally, information on how to fill the resulting wedgelets.

Besides the usage of the wedgelet-based coding concept, newer video and/or picture codecs tend to code pictures in units of coding blocks of different size. The picture's subdivision into coding blocks is, for example, signaled within the data stream and in the units of the coding blocks, for example, prediction modes and/or prediction parameters are coded within the data stream.

The coding efficiency of wedgelet-based coding concepts seems to decrease when being applied onto codecs supporting coding blocks of different size.

SUMMARY

According to an embodiment, a decoder supporting wedgelet-based decoding of coding blocks may have: a prefix reader configured to read, for a current coding block, a prefix of a variable-length coded syntax element from a data stream; a suffix length determiner configured to determine a length of a suffix of the variable-length coded syntax element from the prefix and a size of the current coding block; a suffix reader configured to read, using the length determined, the suffix of the variable-length coded syntax element from the data stream; a wedgelet bi-partitioner configured to determine a bi-partitioning of the current coding block into two wedgelets using the variable-length coded syntax element; and a reconstructor configured to reconstruct the current coding block using the bi-partitioning.

According to another embodiment, a method may have the steps of: reading, for a current coding block, a prefix of a variable-length coded syntax element from a data stream; determining a length of a suffix of the variable-length coded syntax element from the prefix and a size of the current coding block; reading, using the length determined, the suffix of the variable-length coded syntax element from the data stream; determining a bi-partitioning of the current coding block into two wedgelets using the variable-length coded syntax element; and reconstructing the current coding block using the bi-partitioning.

Another embodiment may have an encoder supporting wedgelet-based encoding of coding blocks, the encoder being configured to select for a current coding block a variable-length coded syntax element according to an optimization scheme, and the encoder may have a prefix writer configured to write, for the current coding block, a prefix of the variable-length coded syntax element to a data stream; a suffix length determiner configured to determine a length of a suffix of the variable-length coded syntax element from the prefix and a size of the current coding block; a suffix writer configured to write, using the length determined, the suffix of the variable-length coded syntax element to the data stream; a wedgelet bi-partitioner configured to determine a bi-partitioning of the current coding block into two wedgelets using the variable-length coded syntax element; and a coder configured to code the current coding block using the bi-partitioning.

According to another embodiment, a method may have the steps of: selecting, for a current coding block, a variable-length coded syntax element according to an optimization scheme; writing, for the current coding block, a prefix of the variable-length coded syntax element to a data stream; determining a length of a suffix of the variable-length coded syntax element from the prefix and a size of the current coding block; writing, using the length determined, the suffix of the variable-length coded syntax element to the data stream; determining a bi-partitioning of the current coding block into two wedgelets using the variable-length coded syntax element; and coding the current coding block using the bi-partitioning.

According to another embodiment, a non-transitory digital storage medium having a computer program stored thereon to perform the inventive methods when said computer program is run by a computer.

It is a basic finding of the present invention that wedgelet-based coding in conjunction with the usage of coding blocks of varying size may be rendered more efficient by the usage of a variable length coded syntax element comprising a prefix and a suffix, wherein the size of the suffix is dependent on the prefix and the size of the current coding block. By this measure, it is feasible to efficiently adapt the length of the variable-length coded syntax element which controls the bi-partitioning of the current coding block to the actual needs, namely the size, of the current coding block, and the variability of the bi-partitioning by varying the wedglet separation line, respectively. The greater the current coding block is, the longer the variable-length coded syntax element may be. This length dependency may even be sufficiently effective in terms of coding efficiency so that the variable length coded syntax element may be coded without context-adaptive entropy coding, but directly or using fixed-equal-probability binary entropy coding.

BRIEF DESCRIPTION OF THE DRAWINGS

Embodiments of the present invention will be detailed subsequently referring to the appended drawings, in which.

DETAILED DESCRIPTION OF THE INVENTION

As is known in the art, depth maps show certain characteristics which render the introduction of depth map specific block coding modes in addition to those known from texture coding advantageous. A depth map which is associated with a certain picture, i.e. the texture, turns out to comprise a higher number of areas where the depth maps sample values are parameterizable using a constant or linear function. Often, such areas abut each other along a line representing, for example, the outer circumference of a foreground object separating foreground from background. Accordingly, in order to block-wise code depth maps, a wedgelet separation concept has been introduced according to which the usually rectangular coding blocks may further be subdivided into two wedgelets along a so called wedgelet separation line which separates the corresponding coding block into two halves, i.e. the two wedgelets. The inner of both wedgelets is then coded separately. The additional bits to be spent for bi-partitioning the coding block into two wedgelets and for switching on/off the wedgelet separating mode are overcompensated by the advantage with respect to the coding of the content of the "wedgelet-like" coding blocks.

Figure 1:
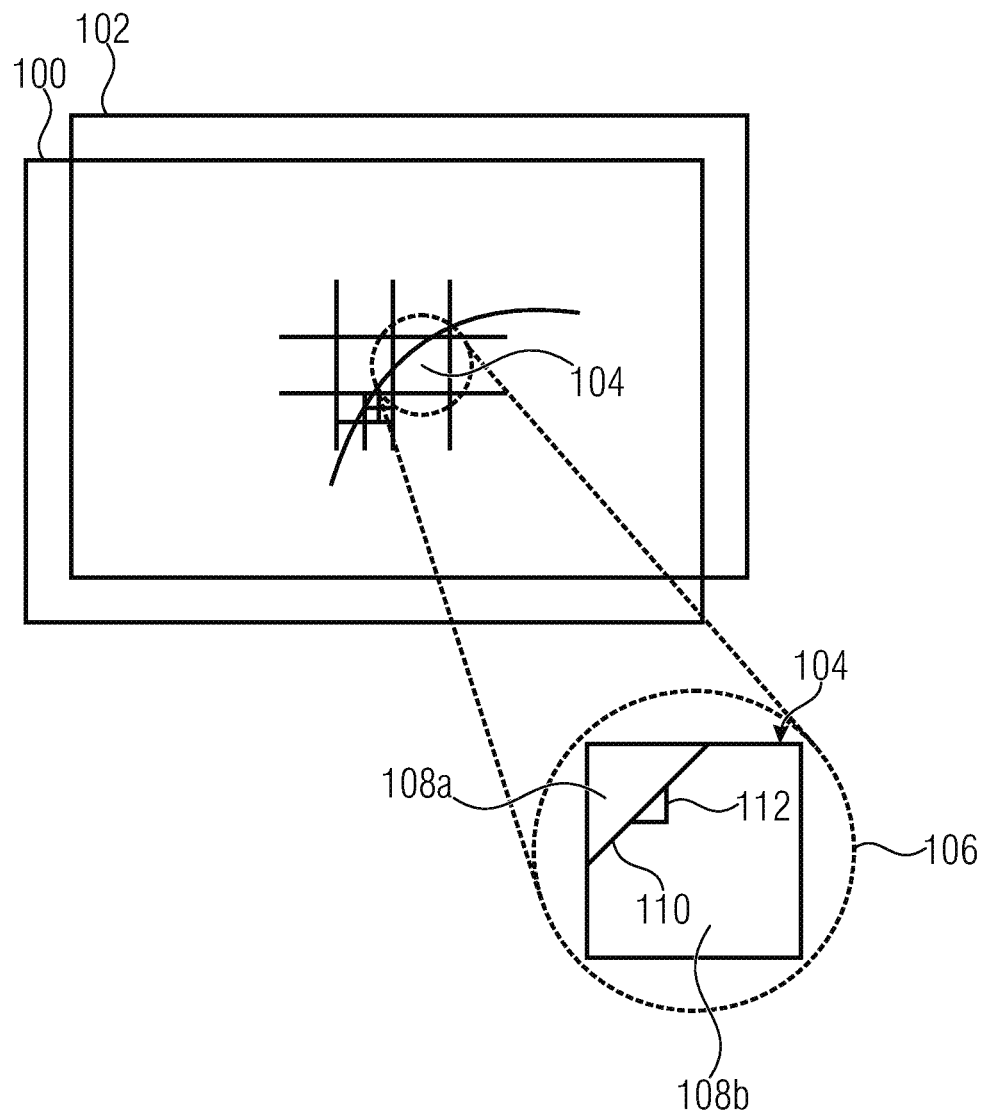
FIG. 1 shows an example for wedgelet-based bi-partitioning of a coding block which is here exemplarily a block of a depth map provided in addition to texture of a picture.

FIG. 1 shows a depth map 100 associated with a picture or texture image 102. The sample resolution of depth map 100 may be equal to the sample resolution of picture 102 although a different sample resolution would also be feasible such as a coarser sample resolution of depth map 100 relative to picture 102. Depth map 100 is coded in coding blocks 104. That is, depth map 100 is subdivided or partitioned into coding blocks 104 which are, for example, of rectangular shape or even of quadratic shape. The partitioning of depth map 100 into coding blocks 104 may be such that the coding blocks 104 are of varying size. Three different sizes are illustrated in FIG. 1 for illustration purposes. The number of available coding block sizes may be different therefrom. The coding blocks 104 define the units at which the encoder switches between different coding modes. The coding modes selected for each coding block 104 may be signaled within the data stream to the decoder which in turn decodes each coding block 104 using the signaled coding mode. One of these coding modes may be a "wedgelet coding mode" according to which the coding block 104 is split into two wedgelets in order to allow the content (i.e. the sample values) of each wedgelet to be coded separately. FIG. 1 illustrates this in the enlarged portion 106 for a representative coding block 104. As can be seen, the coding block 104 is split into two wedgelets 108a and 108b along a wedgelet separation line 110, which is for example a straight line. The encoder signals to the decoder the position of the wedgelet separation line 110 for the coding blocks 104 to which such a wedgelet based coding mode is assigned. There are different possibilities to signal the position of the wedgelet separation line 110: slope or direction 112 of the wedgelet separation line 110 along with one intercept value such as the location of one of the intersections of line 110 with the circumference of block 104, or the location of the two points of intersection of line 110 with block's 104 circumference.

Figure 2:
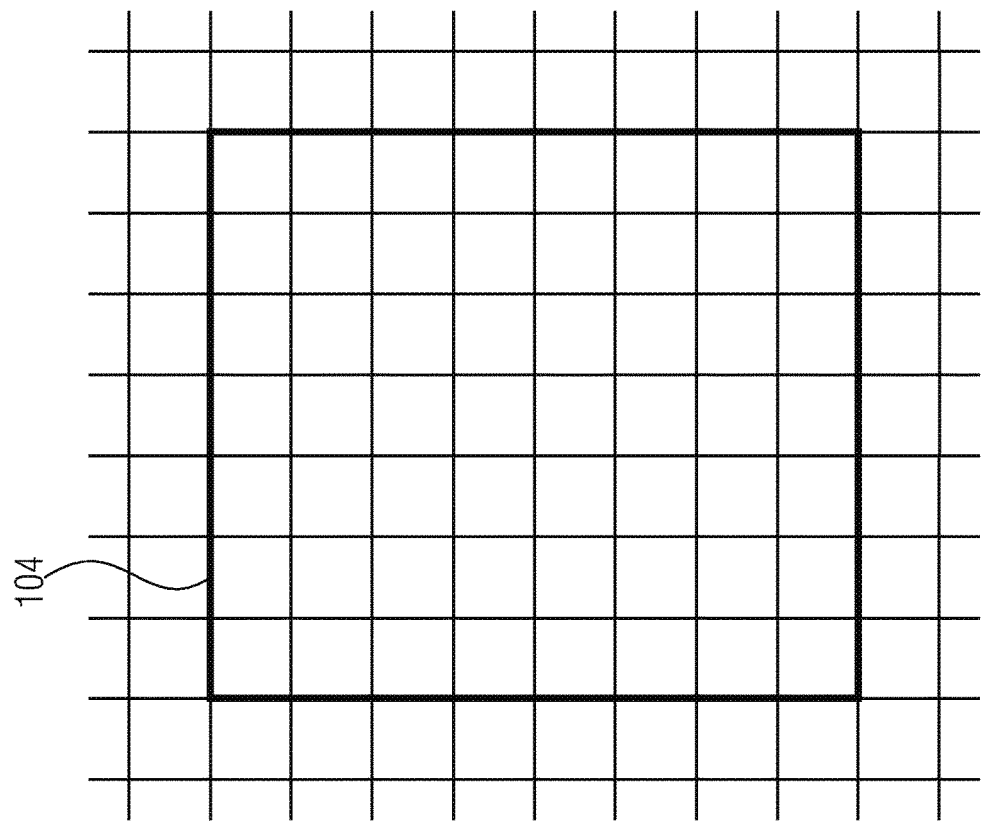
FIG. 2 shows a schematic diagram illustrating coding blocks of different sizes and an example for a bi-partitioning of the smaller one of the coding blocks on the basis of a wedgelet separation line in order to illustrate possible ways to bi-partition a coding block on the basis of a wedgelet separation line.
Figure 2:
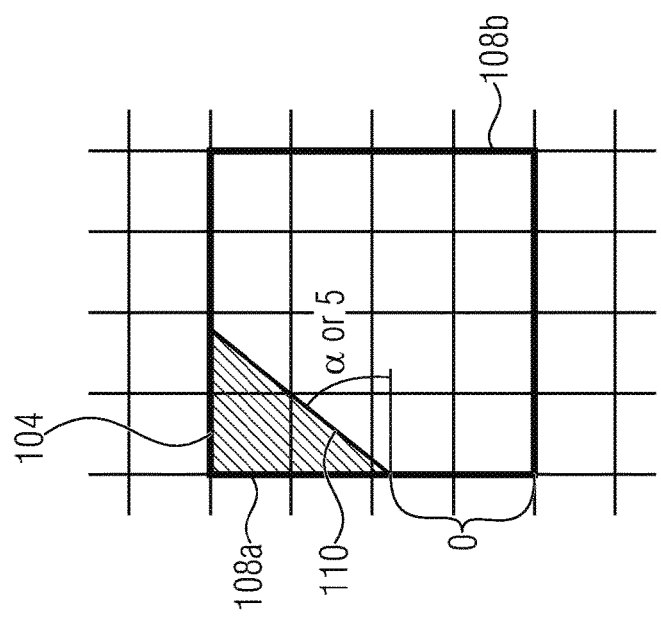

As shown in FIG. 2, the number of possible subdivisions of a coding block 104 into two wedgelets strongly depends on the block's 104 size measured in samples. Block 104 of FIG. 2 shown at the left-hand side, for example, is a 4×4 block, whereas the one shown at the right hand side is 8×8 samples wide. As may be readily understood, owing to the smaller number of samples in the 4×4 block 104, the number of discriminable subdivisions of block 104 into two wedgelets is smaller than compared to the greater coding block shown at the right hand side. For example, a wedgelet separation line 110 is exemplarily shown to bi-partition the 4×4 block 104 into two wedgelets. The transferal of the bi-partitioning defined by the wedgelet separation line 110 onto the block's 104 samples may be done as follows: samples of bock 104 lying on one side of wedgelet separation line 110 are assigned to one wedgelet 108a, for example, whereas samples of block 104 lying on the other side of line 110 are assigned to the other wedgelet 108b. This is easy as far as samples are concerned which are not crossed by line 110. Samples, however, which line 110 crosses are assigned to one of the wedgelets 108a and 108b depending on the side on which the greater half of its area lies. In other words, each sample crossed by line 110 is bi-partitioned into two portions and the greater one of these portions decides which partition the respective sample is assigned to. That is, samples, of which the greater portion lies on the one side, are assigned to partition 108a, for example, while the samples of which the greater portion lies on the other side, are assigned to partition 108b. Alternatively, the center of each sample may be looked at in order to decide on each samples assignment to any of wedgelets 108a and 108b: all samples having their center lying on one side of line 110 are assigned to wedgelet 108a, while the all samples having their center lying on the other side of line 110 are assigned to wedgelet 108b. Hatching in FIG. 2 illustrates the resulting wedgelet partitioning of 4×4 block 104.

It turns out from the above description that the precision of signaling the position of wedgelet separation line 110 should depend on the size of the respective block 104, measured in samples for example The larger the block, the higher the precision should be and vice versa.

Figure 3:
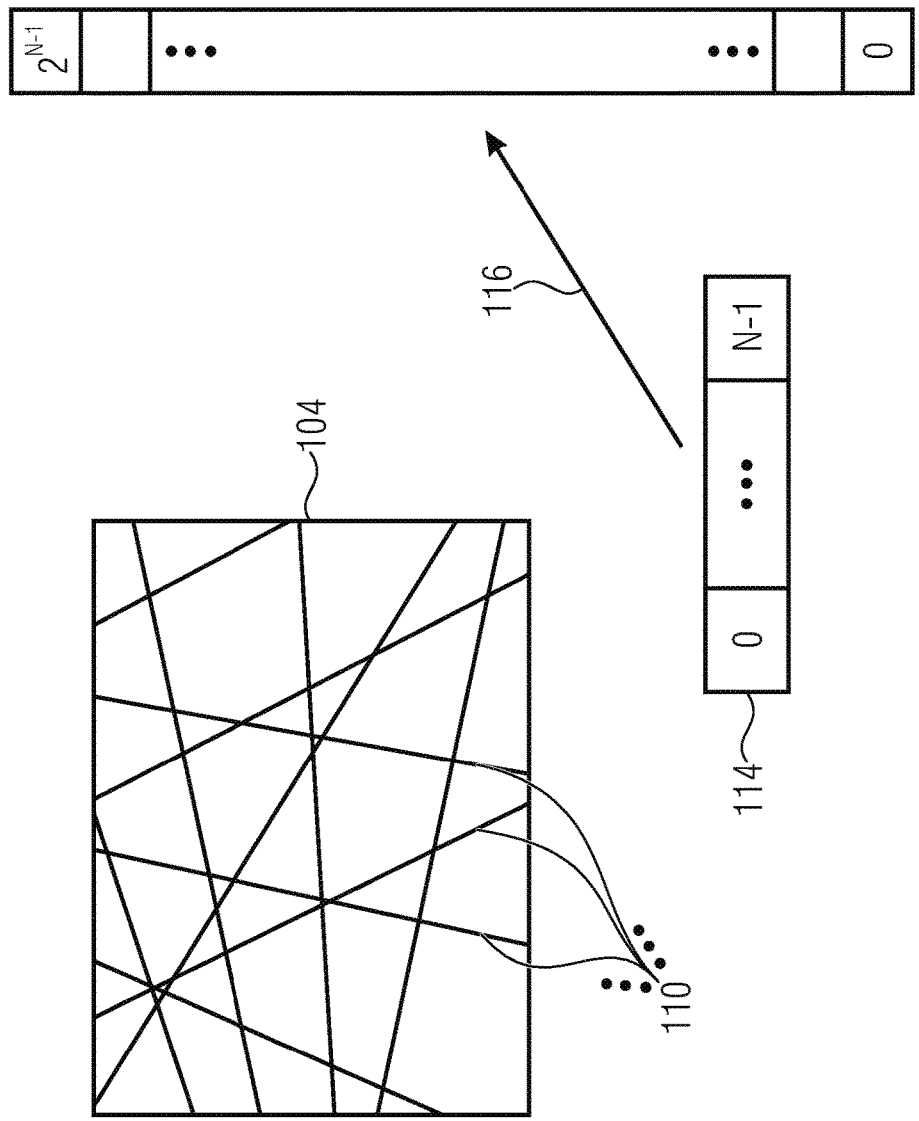
FIG. 3 shows a schematic diagram illustrating an indexing scheme associating positions of a wedgelet separation line with entries of a list into which a syntax element for signaling the wedgelet separation line position points.

It would be feasible to sognal the number of possible positions of the wedgelet separation line of a coding block 104 using one scalar or a one-dimensional index into a one-dimensional list 112 of representable wedgelet separation line positions, the index being, for instance, binarized using a usual binary representation covering $2^N$ states, i.e. allowing to distinguish between $2^N$ possible positions of the wedgelet separation line with N being the bitlength of the binary representation. This is illustrated in FIG. 3. As shown, each list entry in list 112 corresponds to a certain combination of slope/direction 112 of separation line 110, and intersection thereof. In order to account for the block size dependency outlined above with respect to FIG. 2, the index 114 signaled in the data stream for coding block 104 has a bit length N which depends on the size of block 104. The index 114 signaled for block 104 determines, via its bit length, the size of list 112 and, in turn, the number of representable wedgelet separation line positions. The number $2^N$ of representable wedgelet separation line positions is greater for greater blocks 104 than for smaller blocks. That is, a decoder would use the index 114 as an index into list 112 as illustrated by arrow 116, wherein the certain entry of list 112 indexed, is associated with a certain wedgelet separation line position, such as one of those exemplarily illustrated in FIG. 3 within block 104.

Although the above concept of FIG. 3 accounts for the different needs of the differently sized blocks as far as the number of representable wedgelet separation line positions or the precision of its signaling is concerned, and even if a context-adaptive coding would be used in order to code the bits of the signaled index 114 using a common context for all N bits of the index 114, there is still room for rendering the signaling of the wedgelet separation line's 110 position more effective, and thus, the embodiments described hereinafter achieve such coding efficiency increase, even when not using entropy coding for coding the signaling bits. For example, adapting N to the coding block size, and thus the needs in terms of finding a reasonable number of available wedgelet separation line positions, is merely feasible in powers of 2 involving that either some signallable values of the index remain unused, or that more than a reasonable number of wedgelet separation line positions are distinguished so as to totally consume the $2^N$ signallable values of the index.

Figure 4:
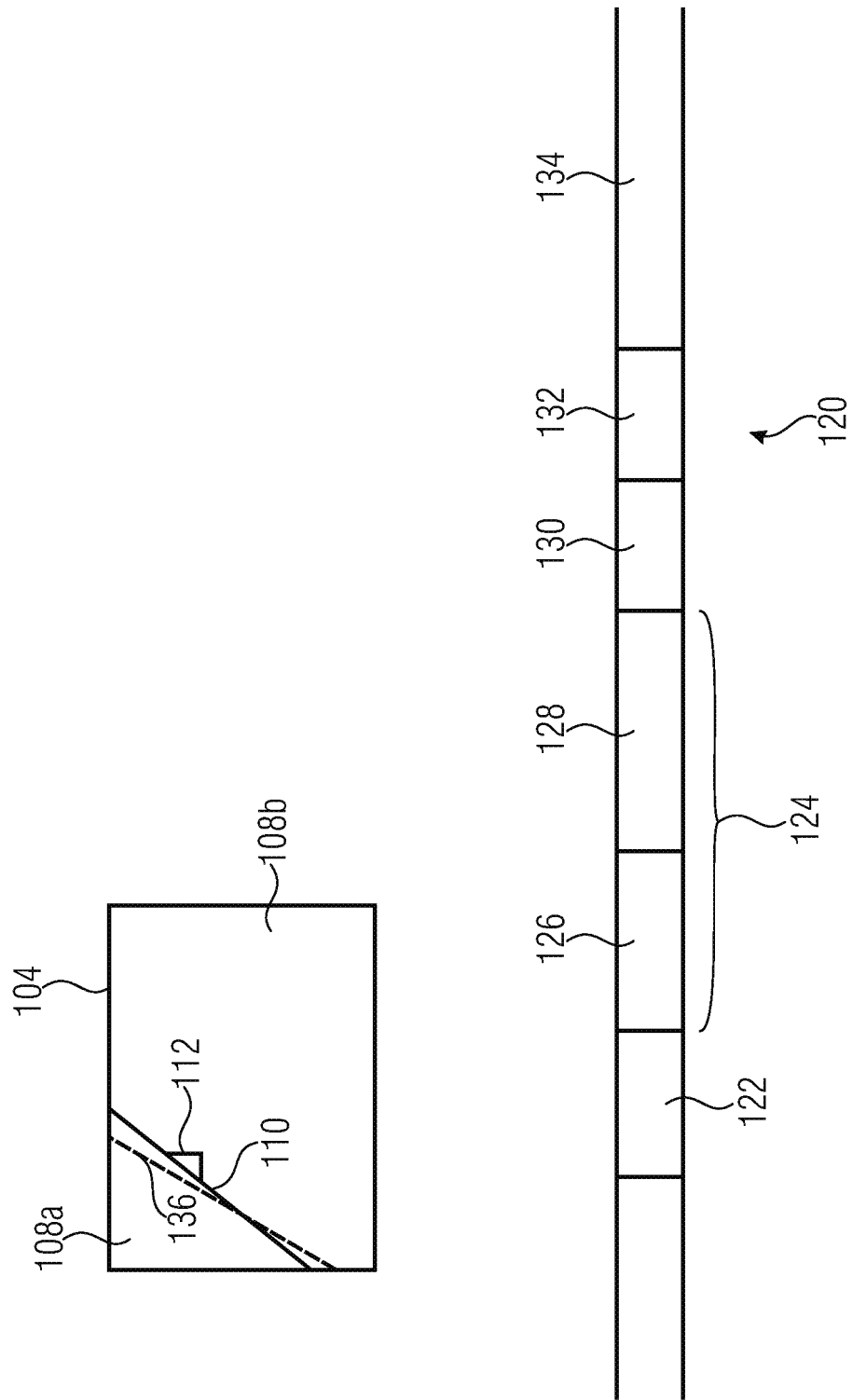
FIG. 4 shows a schematic diagram of an example for syntax elements used as side information for wedgelet-based coding of a coding block in accordance with an embodiment of the present invention.

The idea behind the concept explained the embodiments outlined below is to signal the wedgelet separation line's position for a certain coding block, such as a coding block for which a wedgelet-based coding mode is signaled, using a variable length code syntax element having a prefix which signals the wedgelet separation line's slope/direction followed by a suffix which signals a refinement of the wedgelet-separation line's slope/direction and the wedgelet separation line's translatory displacement or its intercept. FIG. 4 illustrates the concept. FIG. 4 shows a coding block 104. Block 104 may be, for example, a coding block of a depth map, even though it is noted that the concept of FIG. 4 could be readily transferred onto the coding of other two-dimensionally sampled data, such as texture or the like. The data stream 120 into which coding block 104 and the depth map containing the same, respectively, is coded signals, for coding block 104, by way of a mode indicator 122, a wedgelet-based coding mode. Since coding block 104 is of a wedgelet-based coding mode type, data stream 120 additionally includes a variable-length coded syntax element 124 which signals the position of the wedgelet separation line 110 which bi-partitions coding block 104 into two wedgelets 108a and 108b. As will be outlined in more detail below, the variable-length coded syntax element 124 comprises a prefix 126 signaling the direction or slope 112 of the wedgelet separation line 110, and a suffix 128 signaling a translatory positioning and a refinement of the direction/slope 112 of the wedgelet separation line 110. As will be outlined in more detail below, all bits of the variable-length coded syntax element 124 may be coded without context adaptivity and using, for example, no entropy coding, i.e. they could be written into data stream 120 directly, or could be written into data stream 120 using a binary entropy arithmetic coding such as binary arithmetic coding using, however, a fixed equal-probability mode called, for example, a bypass mode, as known for example from H.264. As also described in more detail below, the prefix 126 could be of fixed length, the length of which being independent from block's 104 size, while the bit length of the suffix 128 is dependent on both the value of the prefix 126, i.e. the wedgelet separation line's 110 approximate slope/direction, as well as the coding block's 104 size. Different possibilities exist how the coding block's 104 content is then actually coded in the data stream 120 using the bi-partitioning into partitions 108a and 108b. For example, according to one embodiment, the data stream 120 comprises one syntax element structure 130 for the first wedgelet 108a and a second syntax element structure 132 for the second wedgelet 108b. Both syntax element structures 130 and 132 could, for example, comprise a syntax element indicating a constant with which the samples belonging to the respective wedgelet 108a or 108b are set equal to. The syntax element could be predictively coded. For example, the constant value to be assigned to the samples of wedgelet 108a could be spatially predicted from neighboring already decoded/reconstructed samples adjacent to the portion of the block's 104 circumference to which the wedgelet 108a adjoins, and the syntax element structure 130 would merely provide an offset (prediction residual) to this prediction. Likewise, the constant value to be assigned to the samples of wedgelet 108b could be spatially predicted from neighboring already decoded/reconstructed samples adjacent to the portion of the block's 104 circumference to which the wedgelet 108b adjoins, and the syntax element structure 130 would merely provide an offset to this prediction. Optionally, a sample-wise residual signaling 134 may also be present in the data stream 120.

A decoder would act as follows in order to decode coding block 104 having been coded according to FIG. 4. First of all, the decoder would inspect the coding mode indicator 122. If the coding block 104 is of a wedgelet-based coding mode, the decoder would read the prefix 126 from the data stream 120, thereby obtaining the approximate wedgelet separation line's slope/direction 112. The decoder would then read a number of bits from data stream 120, which number depends on the coding block's 104 size and the value of the prefix 126 so as to obtain the suffix 128. Using the suffix 128 the decoder would refine the approximate wedgelet separation line's 110 slope/direction 112 so as to obtain the actual slope/direction 136 with translatory positioning the wedgelet separation line 110 also depending on the suffix 128. The wedgelet separation line 110 thus positioned determines the bi-partitioning of coding block 104 into the wedgelets 108a and 108b. It is feasible that the decoder directly looks up, using the variable-length coded syntax element 124, in a list of wedgelet-based bi-partitionings of a block of a size corresponding to that of coding block 104, each bi-partitioning corresponding to a position of a wedgelet separation line indicated using prefix 126 and suffix 128 as outlined above so that the decoder actually does not compute the actual slope/direction 136 and any translatory displacement length, but rather directly looks up a binary sample array of the size corresponding to block 104 which, in a binary manner, associates each sample of coding block 104 to wedgelet 108a or wedgelet 108b. Alternatively, as will be outlined below, the decoder computes from the prefix 126 the approximate direction 112 and looks up a binary association array associating each sample of block 104 with one of wedgelets 108a and 108b in a table of associating binary association arrays using an index which is a triplet of the block's 104 size, the approximate direction 112, and the suffix 128.

After having done this, the decoder uses, for example, the syntax element structure 130 so as to obtain the sample values of the samples of—or associated with—wedgelet 108a and uses the syntax element structure 132 to fill the sample values of —or associated with—the samples of wedgelet 108b. The thus filled state of coding block 104 may, optionally, represent a prediction which the decoder refines using the residual signal 134 by a sample-wise addition between the residual signal 134 and the filled wedgelets 108a and 108b. In accordance with an alternative, the residual signal 134 is missing, so that the thus filled state of coding block 104 directly represents the reconstruction of the coding block 104.

Figure 6:
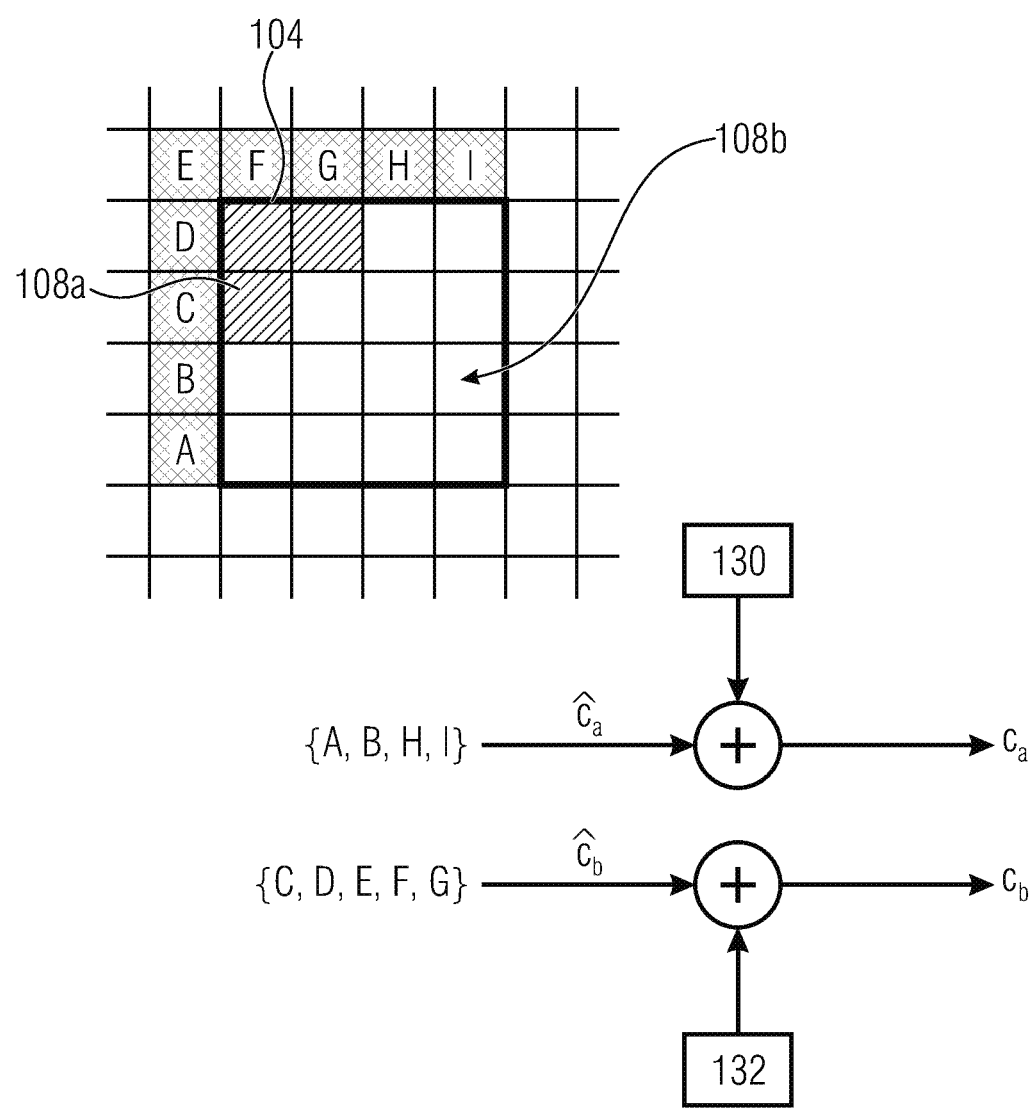
FIG. 6 shows a schematic diagram illustrating a reconstruction of the wedgelet-based coded coding block in accordance with an embodiment.

A specific example as to how to code the content of wedgelets 108a and 108b separately is explained below with respect to FIG. 6. FIG. 6 shows an example for a current coding block 104. In FIG. 6, block 104 is exemplarily a 4×4 sample wide block. The association of the block's 104 samples to wedgelets 108a and 108b, respectively, is indicated using hatching. Using cross-hatching, those samples adjacent to coding block 104 are shown, which are already decoded/reconstructed. Typically, these neighboring samples lie to the top of and to the left of current coding block 104. In order to be able to differentiate these neighboring samples, these neighboring samples are exemplarily indicated using capital letters A to I. As is shown in FIG. 6, a subset {C, D, E, F, G} of neighboring samples is adjacent to a portion of the circumference of block 104, to which wedgelet 108a adjoins, while subset {A, B, H, I} is adjacent to a portion of block's 104 circumference, to which the other wedgelet 108b adjoins. The decoder determines on the basis of the first set a predicted constant value $\hat{c}_a$ such as, for example, by subjecting the decoded values of these neighboring samples, or a predetermined subset thereof, to some averaging process, and uses the syntax element structure 130 along with the prediction $\hat{c}_a$ so as to compute the constant value $c_a$ to the value of which the sample values of the samples of wedgelet 108a are set, such as by summing $\hat{c}_a$ and the value of the syntax element structure 130. Likewise, the decoder subjects the sample values of the samples of the second set, or a predetermined subset, thereof to an averaging process in order to obtain a predicted constant value $\hat{c}_b$, refines this prediction using the syntax element structure 132 so as to obtain a constant value $c_b$ for wedgelet 108b and then sets the sample values of the samples of wedgelet 108b to the this constant value. The "averaging process" may, for example, involve the computation of an arithmetic mean, median or the like and may vanish if merely one sample value is present in the subset. Instead of using the complete subset {A, B, H, I} and {C, D, E, F, G}, respectively, the decoder may select the predetermined subset out of these subsets by merely endorsing neighboring already decoded samples at certain predetermined positions along the block's 104 circumference, such as for example merely neighboring already decoded samples neighboring one of the corner samples of block 104. In that case, merely subsets {A, I} and {D, E, F}, respectively, would be subject to an averaging process. It may happen that none of the neighboring already decoded samples neighbors one of wedgelets 108a, 108b so that the respective predicted constant value may not be obtained using spatial prediction for this wedgelet specifically and in that case, a differently obtained, or even default, value for the predicted constant value may be used instead, such as 0 or some other value. The set of neighboring samples used for predicting the samples of the wedgelets need not to immediately neighbor the wedgelets and the current block, respectively. They may be determined, alternatively, by another predetermined relative locational relationship to the current coding block such as lying in the sample column to the left of the current coding block, in the sample row of the top left hand sample and the bottom left hand sample of the current coding block, such as samples {A,D} and lying in the sample row to the top of the current coding block, in the sample column of the top left hand sample and the top right hand sample of the current coding block, such as {F,I}, respectively. Even alternatively, no averaging may by used or, even alternatively speaking, the set of neighboring samples which is finally used to predict the samples of wedgelet 108a and the set of neighboring samples which is finally used to predict the samples of wedgelet 108b may merely comprise one neighboring sample. A selection process which depends on the bi-partitioning determined for the current coding block, may select the one neighboring sample for one of the wedgelets 108a and 108b out of the set of neighboring candidate samples, such as {A,D}, and likewise selection process which depends on the bi-partitioning determined for the current coding block, may select the one neighboring sample for the other one of the wedgelets out of the set of neighboring candidate samples, such as {F,I}. The samples of the wedglets are then predicted by the respectively selected neighboring sample. As there may be the case that one of the wedgelets is distanced from all neighboring candidate samples because, for example, the wedgelet is positioned at the bottom right-hand corner of the coding block, at least one of the sets of candidate nmeighboring samples may include a default constant value. A mixture out of the averaging process and the slelcting-one process may be used as well. For example, The selection process may interrogate whether the top left hand sample of the coding block lies within the same wedgelt as the top right hand sample, and whether the top left hand sample of the coding block lies within the same wedgelt as the bottom left hand sample. If both interrogations are answered with yes, then it may be determined that the wedgelet substantially runs diagonally from bottom left to top right and the prediction values for the wedgelets are determined by averaging {D,F} for one wedgelet and {A,I} for the other wedgelet with using a constant default value instead of the average of {A,I} if the interrogations reveal that all samples of the top left, top right and bottom left ones, lie within one wedgelet, i.e. one wedgelet does not neighbor any one of {A,D, F, I} so that the dfault value is used as predictor for the latter wedgelet. If the interroogations are answered differently, however, it may be determined that the wedgelet substantially runs either horizontally or vertically, and in the first case the neighboring sample A may be used for one wedgelet, and the neighboring sample in the mid between F and I, such as G, may be used for the other wedgelet, and in the second case the neighboring sample I may be used for one wedgelet, and the neighboring sample in the mid between A and D, such as C, may be used for the other wedgelet.

As is mentioned below, a flag in the syntax of coding block 104 may additionally be present in the data stream which switches on/off the transmission of the syntax element structures 130 and 132. If not present, the predicted constant values $\hat{c}_a$ and $\hat{c}_b$ are used directly as the constant values $c_a$ and $c_b$, respectively, without any refinement.

The advantage of the concept of FIG. 4 compared to the concept of FIG. 3 is as follows. With increasing size of the coding block 104 the length of the syntax element 114 becomes greater and greater. With each additional bit, however, the representable interval range, i.e. the size of list 112, increases exponentially. That is, the quantization of the size of the syntax element 114 and the adaptation of its length to the actual needs imposed by the size of the coding block 104 is difficult to achieve because the list 112 lists all available combinations of slope 112 and intercept. By using a variable-length coded syntax element 124, the data rate to be spent for all of the coding blocks being coded using the wedgelet-based coding mode is reduced because it is feasible to adapt the length of the suffix 128 to the actual needs. One example has been outlined above: the prefix may indicate the wedgelet separation line's approximate direction and the length of the suffix may be rendered dependent on this direction as well as the coding block's size. By this measure, it is easy to adapt the length of the suffix 128 to the approximate direction 112: approximate directions nearby the exact horizontal or vertical extension need a lower number of refinements, i.e. suffix states. The length of the suffix, thus, varies between smaller values where the "quantization" of the suffix length in units of bits is less negatively affected by the exponential relationship between representable states and bit length of the suffix 128. Accordingly, the bit rate spent for syntax element 124 may be more closely adapted to the actual optimum as discussed with respect FIG. 2.

Figure 5:
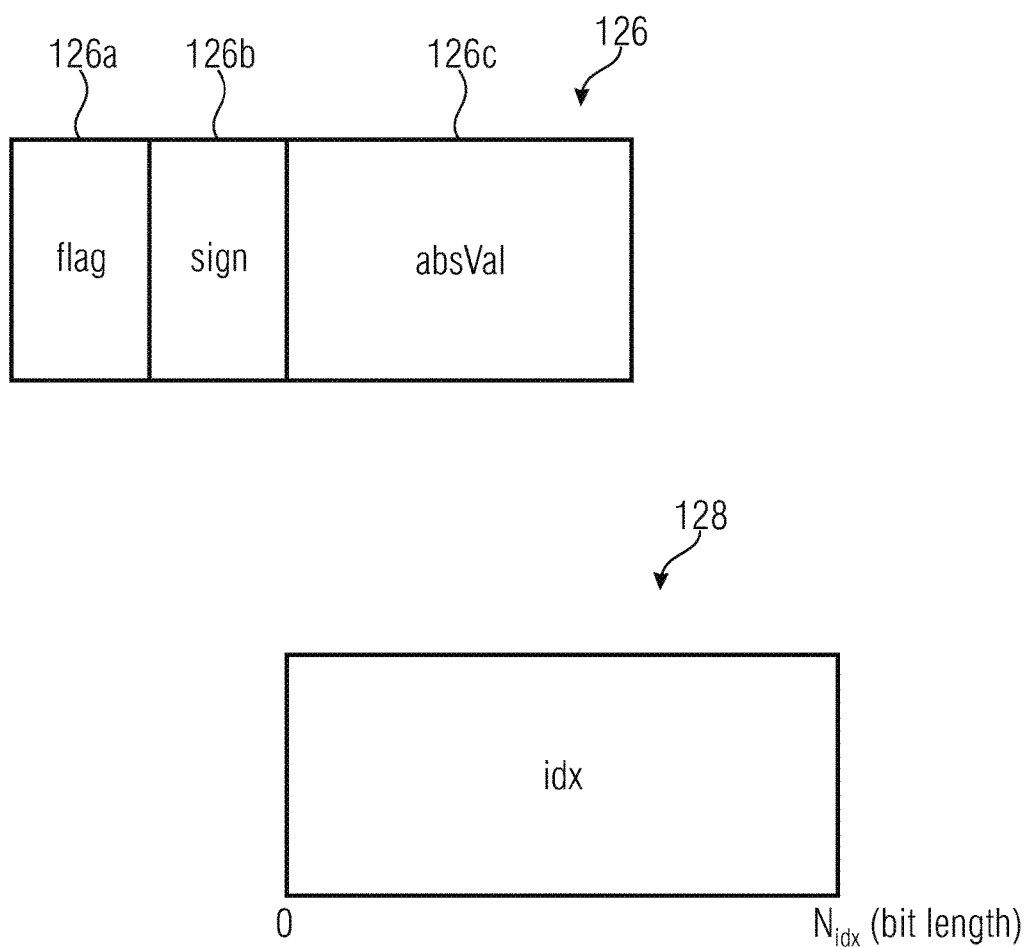
FIG. 5 shows a schematic diagram illustrating a composition of the variable-length coded syntax element of FIG. 4 on the basis of a prefix and a suffix in accordance with an embodiment in more detail.

FIG. 5 shows, for the sake of completeness, how the prefix 126 may be composed using the syntax elements mentioned above in section 3 so as to result in a fixed length 5-bit prefix 126, and the same with respect to the suffix 128. As shown, the prefix 126 is composed of a flag 126a indicating whether the coarse/approximate wedgelet separation line direction/slope 12 is substantially horizontal or substantially vertical, a sign bit 126b indicating the angular direction into which slope/direction 12 of the wedgelet separation line 110 deviates from the horizontal or vertical direction, and a fixed-bit-length value absVal 126c indicating the amount of angular deviation. The suffix 128 comprises the syntax element idx. The bit length of idx, namely $N_{idx}$ depends, as outlined above, not only on the size of the coding block 104 but also on the prefix 126 which, in turn, indicates the approximate wedgelet separation line's slope/direction 112. The table shown below shows an example for a dependency of the bit length of suffix 128, i.e. $N_{idx}$, from illustrative block sizes of coding block 104 on the one hand and slope/direction 112 on the other hand by showing, for each exemplary block size, the minimum and maximum values of $N_{idx}$ of the suffix 128.

In a specific embodiment, the above described concept may be translated into an explicit example as follows. In doing so, the "flag" 126a would be wedge_dir_flag, sign 127b would be wedge_dir_sign_flag, absVal 126c would correspond to wedge_dir_abs and idx 128 corresponds to wedge_dir_tab_idx.

In that case, a relevant syntax structure contained in the data stream for a certain wedgelet-based coded coding block 104 at x0, y0 (its position within the depth map or picture) may then be written as follows:

| | |
|---|---|
| wedge_dir_flag[ x0 ][ y0 ] | ae(v) |
| wedge_dir_sign_flag[ x0 ][ y0 ] | ae(v) |
| wedge_dir_abs[ x0 ][ y0 ] | ae(v) |
| wedge_dir_tab_idx[ x0 ][ y0 ] | ae(v) |

Figure 9:
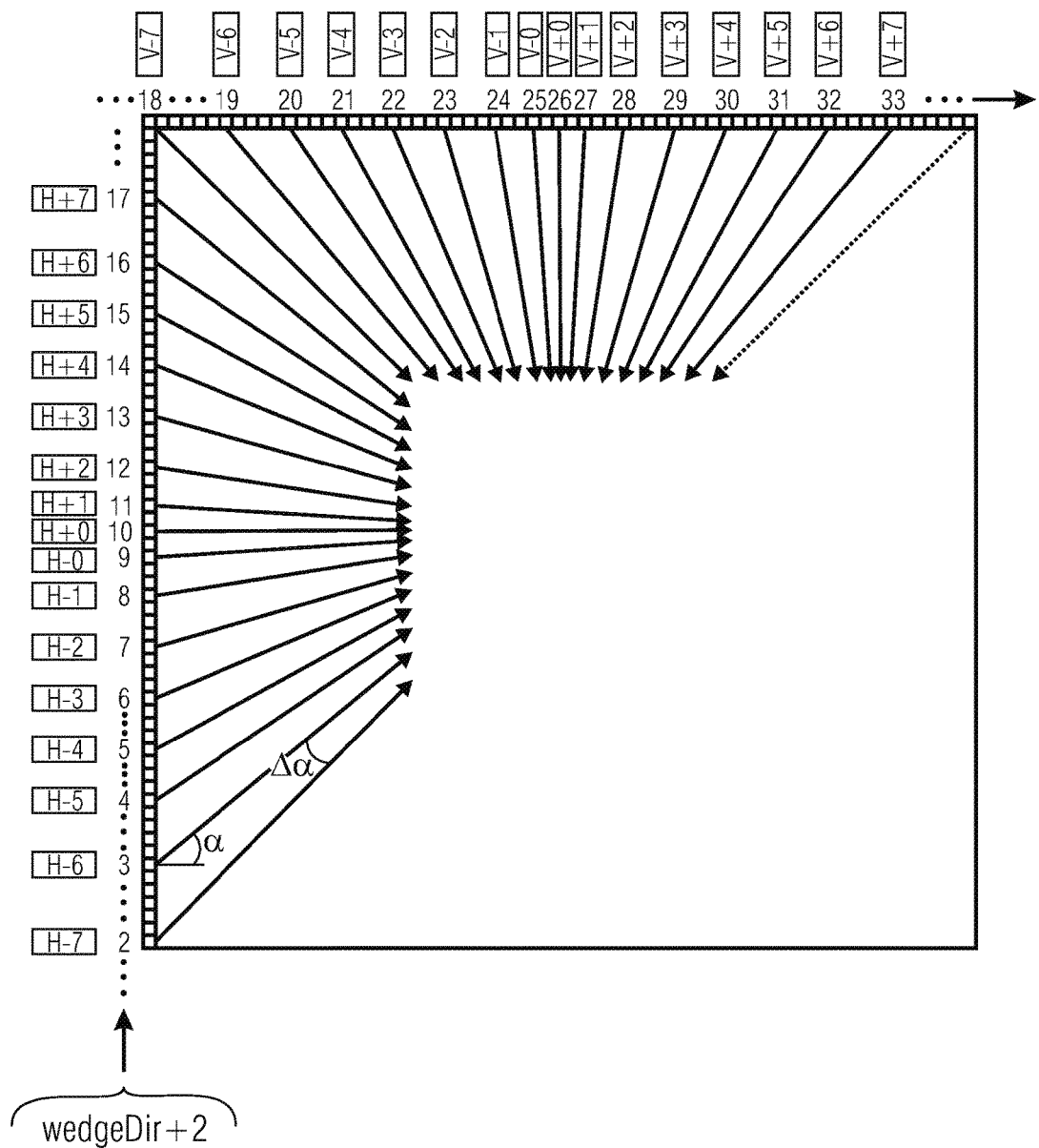
FIG. 9 shows possible approximate directions/slopes as codable by the prefix according to an embodiment.

The length of wedge_dir_tab_idx, i.e. the length of the suffix of the variable-length syntax element comprised of all the listed syntax elements, measured in bits is wedgeDirTabIdxBits. This length may be determined dependent on the size log 2PbSize of the coding block 104 and the approximate wedgelet separation line direction WedgeDir as shown in the following table—the association of the values of WedgeDir to actual slopes/directions according to the present example is illustrated in FIG. 9:

| Values of wedgeDirTabIdxBits [log2PUSize][WedgeDir] | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| Initialization variable | | | | | | | | | | | | | | | wedgeDirTabIdxBits | | | | | | | | | | | | | | | | | | | |
| WedgeDir | | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| log2PbSize | | | | | | | | | | | | | | | | | | | | | | | | | | | | | | | | | | |
| 2 | Value | 3 | 1 | 2 | 2 | 0 | 3 | 1 | 0 | 0 | 0 | 1 | 3 | 0 | 3 | 2 | 0 | 3 | 1 | 2 | 2 | 0 | 3 | 1 | 0 | 0 | 0 | 1 | 3 | 0 | 3 | 2 | 0 |
| 3 | Value | 5 | 5 | 6 | 5 | 5 | 6 | 5 | 4 | 3 | 4 | 5 | 6 | 5 | 5 | 6 | 5 | 5 | 5 | 6 | 5 | 5 | 6 | 5 | 4 | 3 | 4 | 5 | 6 | 5 | 5 | 6 | 5 |
| 4 | Value | 6 | 6 | 6 | 6 | 6 | 6 | 6 | 4 | 6 | 6 | 6 | 6 | 6 | 6 | 6 | 6 | 6 | 6 | 6 | 6 | 6 | 6 | 6 | 4 | 6 | 6 | 6 | 6 | 6 | 6 | 6 | 6 |
| 5 | Value | 6 | 6 | 6 | 6 | 6 | 6 | 6 | 4 | 6 | 6 | 6 | 6 | 6 | 6 | 6 | 6 | 6 | 6 | 6 | 6 | 6 | 6 | 6 | 4 | 6 | 6 | 6 | 6 | 6 | 6 | 6 | 6 |

Log 2PbSize may be logarithm dualis of the height or width of the coding block measured in samples. That is, in the example just outlined, the decoder actually determines the approximate wedgelet separation line direction as follows:

wedge_dir_flag[x0] [y0], wedge_dir_sign_flag[x0] [y0]. wedge_dir_abs[x0] [y0]

are used to derive WedgeDir[x0] [y0] as follows:

WedgeDir[x0] [y0]=(3−2*wedge_dir_flag[x0] [y0])«3−wedge_dir_sign_flag[x0] [y0]+(1− 2*wedge_dir_sign_flag[x0] [y0])* wedge_dir_abs[x0] [y0]

wedgeDir may assume values from 0 to 31, both inclusively, corresponding to the 32 exemplarily shown direction/slopes of FIG. 9.

Naturally, the exact formulae depends on the circumstance and may look different. However, generally the formulae interprets the meaning of wedge_dir_flag, wedge_dir_sign_flag and wedge_dir_abs as outlined above with respect to FIG. 4.

The binary association of each sample of the current coding block to one of the two wedgelets may then be indicated by the binary array wedgePattern. In particular, wedgePattern may be collected in one lookup table WedgeDirPatternTable, the lookup table being three-dimensional and using a three-dimensional index to locate the correct bi-partitioning array, the index being composed of the block size Log 2PbSize of the coding block, the approximate wedgelet separation line direction WedgeDir and the transmitted suffix, namely wedge_dir_tab_idx.

That is, wedge pattern may be looked-up as follows:

wedgePattern =WedgeDirPatternTable[Log 2PbSize] [WedgeDir] [wedge_dir_tab_idx]

The lookup table may, exemplarily, be derived as follows. The array WedgeDirPatternTable[log 2BlkSize] [dirIdx] of binary partition patterns of size (1«log 2BlkSize)×(1«log 2BlkSize), the variable NumWedgeDirPattern[log 2BlkSize] [dirIdx] specifying the number of binary partition patterns in list WedgeDirPatternTable[log 2BlkSize] [dirIdx] are derived as specified in the following:

For log 2BlkSize ranging from 2 to some maximum size, inclusive, the following applies:

Depending on log 2BlkSize (which shall equal log 2PbSize mentioned above), the variable resShift is derived as specified in the next Table.

TABLE

Specification of resShift

| log2BlkSize | resShift |
|---|---|
| 2, 3 | 1 |
| 4 | 0 |
| Otherwise (grater block sizes) | −1 |

The variable wBlkSize is set equal to (1«(log 2BlkSize+resShift))

For wedgeOri in the range of 0 to 5, inclusive, the following ordered steps apply.

Depending on wedgeOri the variables xPosS, yPosS, xPosE, yPosE, xIncS, yIncS, xIncE, yIncE are derived as specified in the next Table.

TABLE

Specification of xPosS, yPosS, xPosE, yPosE, xIncS, yIncS, xIncE, yIncE

| wedgeOri | 0 | 1 | 2 | 3 | 4 | 5 |
|---|---|---|---|---|---|---|
| xPosS | 0 | wBlkSize − 1 | wBlkSize − 1 | 0 | 0 | wBlkSize − 1 |
| yPosS | 0 | 0 | wBlkSize − 1 | wBlkSize − 1 | 0 | 0 |
| xPosE | 0 | wBlkSize − 1 | wBlkSize − 1 | 0 | 0 | 0 |
| yPosE | 0 | 0 | wBlkSize − 1 | wBlkSize − 1 | wBlkSize − 1 | 0 |
| xIncS | 1 | 0 | −1 | 0 | 1 | 0 |
| yIncS | 0 | 1 | 0 | −1 | 0 | 1 |
| xIncE | 0 | −1 | 0 | 1 | 1 | 0 |
| yIncE | 1 | 0 | −1 | 0 | 0 | 1 |

For m in the range of 0 to wBlkSize—1, inclusive, the following applies:

For n in the range of 0 to wBlkSize—1, inclusive, the following applies:

The Wedgelet pattern generation process as specified below is invoked with patternSize being equal to (1«log 2BlkSize), the variable resShift, variable wedgeOri, xS being equal to (xPosS+m*xIncS), yS being equal to (yPosS +m*yIncS), xE being equal to (xPosE+n*xIncE) and yE being equal to (yPosE+n*yIncE) as inputs and the output is the binary array curWedgePattern.

The variable wDir specifying the direction of curWedgePattern is derived as specified in the following (In other words, the base/general direction wDir assuming values from 0 to 31, both inclusively, is determined here for each wedgelet pattern and used thereinafter for wedgeDirPatternTable[log 2BlkSize] [dirIdx] []):

A variable deltaX is set equal to ((xPosE+n*xIncE)−(xPosS+m*xIncS)) and a variable deltaY is set equal to ((yPosE+n*yIncE)−(yPosS+m*yIncS)).

If deltaX is equal to 0 and delta Y is equal to 0 the following applies:

If (xPosS+m*xIncS) is equal to (yPosS+m*yIncS), wDir is set to 0,

Otherwise ((xPosS+m*xIncS) is not equal to (yPosS+m*yIncS)), wDir is set to 16.

Otherwise (deltaX is not equal to 0 or deltaY is nor equal to 0), the following applies:

```
verFlag = ( abs( deltaY ) > abs( deltaX ) ) ? 1 : 0
if( verFlag = = 1) {
    ( deltaX, deltaY ) = Swap( deltaX, deltaY )
}
if( deltaY = = 0) && ( wedgeOri < 4 ) {
    deltaY = 1
    deltaX = deltaX << 1
}
lS = ( deltaY << 7 ) / deltaX
angOff = ( lS < 4 ) ? 0 : ( ( lS < 14 ) ? 1 : ( ( lS < 28 ) ? 2 : ( ( lS < 44 ) ? 3 : ( ( lS < 60 ) ? 4 : ( ( lS < 76 ) ? 5 : ( ( lS < 94 ) ? 6 : ( ( lS < 115 ) ? 7 : 8 ) ) ) ) ) ) )
sign = ( ( lS < 0 ) ? -1 : 1 ) * ( verFlag ? 1 : -1 )
wDir = ( ( 1 + 2 * verFlag ) << 3 + sign * angOff ) % 32
```

The wedgelet pattern list insertion process as specified below is invoked with log 2BlkSize, the variable wDir, and the binary partition pattern curWedgePattern as inputs.

Wedgelet Pattern Generation Process

Inputs to the wedgelet pattern generation process are:

a variable patternSize specifying the binary partition pattern size, a resolution shift value resShift specifying the precision of the wedgelet partition start and end positions relative to patternSize, a variable wedgeOri specifying the orientation identifier of the wedgelet pattern, a variable xS specifying the partition line start horizontal position, a variable yS specifying the partition line start vertical position, a variable xE specifying the partition line end horizontal position, a variable yE specifying the partition line end vertical position.

An output of the wedgelet pattern generation process is:
binary array wedgePattern[x] [y] of size (patternSize)×(patternSize)

The variable curSize specifying the size of the current partition pattern is derived as follows:

curSize=(resShift==1)?(patternSize«1):patternSize

When resShift is equal to −1 variables xS, yS, xE and yE are modified as specified in the next Table.

TABLE

Specification of xS, yS, xE, yE

| wedgeOri | xS | yS | xE | yE |
|---|---|---|---|---|
| 0 | xS << 1 | yS << 1 | xE << 1 | yE << 1 |
| 1 | curSize − 1 | yS << 1 | xE << 1 | yE << 1 |
| 2 | xS << 1 | curSize − 1 | curSize − 1 | yE << 1 |
| 3 | xS << 1 | yS << 1 | xE << 1 | curSize − 1 |
| 4 | xS << 1 | yS << 1 | xE << 1 | curSize − 1 |
| 5 | curSize − 1 | yS << 1 | xE << 1 | yE << 1 |

The values of variable curPattern[x] [y], are derived as specified by the following ordered steps.
1. For x, y=0 . . . curSize−1, curPattern[x] [y] is set equal to 0.
2. The samples of the array curPattern that form a line between (xS, yS) and (xE, yE) are set equal to 1 as specified in the following:

```
x0 = xS
y0 = yS
x1 = xE
y1 = yE
if( abs( yE − yS ) > abs( xE − xS ) ) {
    ( x0, y0 ) = Swap( x0, y0 )
    ( x1, y1 ) = Swap( x1, y1 )
}
if( x0 > x1 ) {
    ( x0, x1 ) = Swap( x0, x1 )
    ( y0, y1 ) = Swap( y0, y1 )
}
sumErr = 0
posY = y0
for( posX = x0; posX <= x1; posX + + ) {
    if( abs( yE − yS ) > abs( xE − xS ) )
        curPattern[ posY ][ posX ] = 1
    else
        curPattern[ posX ][ posY ] = 1
    sumErr + = ( abs( y1 − y0 ) << 1)
    if( sumErr >= ( x1 − x0 ) ) {
        posY + = ( y0 < y1 ) ? 1 : −1
        sumErr −= ( x1 − x0) << 1
    }
}
```

3. The samples of curPattern belonging to the smaller partition are set equal to 1 as specified in the following:

```
if( wedgeOri = = 0 )
    for( iX = 0; iX < xS; iX ++ )
        for( iY = 0; curPattern[ iX ][ iY ] = = 0; iY++ )
            curPattern[ ix ][ iY ] = 1
else if( wedgeOri = = 1 )
    for( iY = 0; iY < yS; iY++ )
        for( iX = curSize − 1; curPattern[ ix ][ iY ] = = 0 ; iX-- )
            curPattern[ iX ][ iY ] = 1
else if( wedgeOri = = 2 )
    for( iX = curSize − 1; iX > xS; iX-- )
        for( iY = curSize − 1; curPattern[ iX ][ iY ] = = 0 ; iY--)
            curPattern[ iX ][ iY ] = 1
else if( wedgeOri = = 3 )
```

-continued

```
    for( iY = curSize − 1; iY > yS; iY-- )
        for( iX = 0; curPattern[ iX ][ iY ] = = 0 ; iX++)
            curPattern[ iX ][ iY ] = 1
else if( wedgeOri = = 4 ) && ( ( xS + xE ) < curSize ) )
    for( iY = 0; iY < curSize; iY ++ )
        for( iX = 0; curPattern[ iX ][ iY ] = = 0 ; iX +)
            curPattern[ iX ][ iY ] = 1
else if( wedgeOri = = 4 )
    for( iY = 0; iY < curSize; iY++ )
        for( iX = curSize − 1; curPattern[ iX ][ iY ] = = 0 ; iX--)
            curPattern[ iX ][ iY ] = 1
else if( wedgeOri = = 5) && ( ( yS + yE ) < curSize ) )
    for( iX = 0; iX < curSize; iX ++ )
        for( iY = 0; curPattern[ iX ][ iY ] = = 0 ; iY++ )
            curPattern[ iX ][ iY ] = 1
else if( wedgeOri = = 5 )
    for( iX = 0; iX < curSize; iX++ )
        for( iY = curSize − 1; curPattern[ iX ][ iY ] = = 0 ; iY-- )
            curPattern[ iX ][ iY ] = 1
```

4. The binary partition pattern wedgePattern[x] [y], with x, y=0 . . . patternSize−1, is derived as specified in the following.
If resShift is equal to 1, the following applies.
Depending on wedgeOri, the variables xOff and yOff are set as specified in the next Table.

TABLE

Specification of xOff, yOff

| wedgeOri | (xS + xE) < curSize | xOff | yOff |
|---|---|---|---|
| 0 |  | 0 | 0 |
| 1 |  | 1 | 0 |
| 2 |  | 1 | 1 |
| 3 |  | 0 | 1 |
| 4 | 0 | 1 | 0 |
| 4 | 1 | 0 | 0 |
| 5 | 0 | 0 | 1 |
| 5 | 1 | 0 | 0 |

For x, y=0 . . . patternSize−1 the following applies:
wedgePattern[x] [y]=curPattern[(x«1)+xOff] [(y«1)+yOff]
Otherwise (resShift is not equal to 1), wedgePattern is set equal to curPattern.

Wedgelet Pattern List Insertion Process
Inputs to the wedgelet pattern list insertion process are:
a variable log 2BlkSize specifying the binary partition pattern size as (1«log 2BlkSize),
a variable wDir specifiying the direction of the Wedgelet pattern,
binary partition pattern wedgePattern[x] [y], with x, y =0 . . . (1«log 2BlkSize)−1.
The variable isValidFlag specifying whether the binary partition pattern wedgePattern is added to the list WedgeDirPatternTable[log 2BlkSize] [wDir] or not is set equal to 0.
The value of isValidFlag is derived as specified by the following ordered steps.
1. For x, y=0 . . . (1«log 2BlkSize)−1 the following applies.
When wedgePattern[x] [y] is not equal to wedgePattern [0] [0] the flag isValidFlag is set to 1.
For dir in the range of 0 to 31, inclusive, the following applies.
For k=0 . . . NumWedgeDirPattern[log 2BlkSize] [dir]−1 the following applies.
The flag patIdenticalFlag is set equal to 1.

For x, y=0 . . . (1«log 2BlkSize)−1 the following applies.
  When wedgePattern[x] [y] is not equal to WedgeDirPatternTable[log 2BlkSize] [dir] [k] [x] [y] patIdenticalFlag is set to 0.
  When patIdenticalFlag is equal to 1, isValidFlag is set to 0.
2. For dir in the range of 0 to 31, inclusive, the following applies.
For k=0 . . . NumWedgeDirPattern[log 2BlkSize] [dir] −1 the following applies.
The flag patInvIdenticalFlag is set to 1.
For x, y=0 . . . (1«log 2BlkSize)−1 the following applies.
  When wedgePattern[x] [y] is equal to WedgeDirPatternTable[log 2BlkSize] [dir] [k] [x] [y] patInvIdenticalFlag is set to 0.
  When patInvIdenticalFlag is equal to 1, isValidFlag is set to 0. When isValidFlag is equal to 1, the following applies.
The pattern WedgeDirPatternTable[log 2BlkSize] [wDir] [NumWedgeDirPattern[log 2BlkSize] [wDir]] is set equal to wedgePattern.
The value of NumWedgeDirPattern[log 2BlkSize] [wDir] is increased by one.

The above example of transmitting the variable-length coded syntax element, may be extended in the following way so as to convey the syntax element structures 130 and 132. In particular, the following syntax may follow the above-identified four lines concerning wedge_dir_flag, wedge_dir_sign_flag, wedge_dir_abs and wedge_dir_tab_idx:

```
depth_dc_flag[ x0 ][ y0 ]                         ae(v)
if ( depth_dc_flag[ x0 ][ y0 ] )
    for( i = 0; i < dcNumSeg; i ++ ) {
        depth_dc_abs[ x0 ][ y0 ][ i ]             ae(v)
        if ( depth_dc_abs[ x0 ][ y0 ][ i ])
            depth_dc_sign_flag[ x0 ][ y0 ][ i ]   ae(v)
    }
```

That is, for a certain coding block, in addition to the wedgelet separation related syntax, the just listed syntax element structure would be contained in the data stream 120. The syntax element depth_dc_flag is optional, i.e. may not be present in the data stream, and signals to the decoder whether any refinement of the predicted constant values $\hat{c}_a$ and $\hat{c}_b$ actually follows or not. Again, depth_dc_flag may be alternatively left away with, instead, unconditionally transmitting the following syntax elements depth_dc_abs and depth_dc_sign_flag. If transmitted, depth_dc_abs is transmitted for each wedgelet 108a and 108b with dcNumSeg being 2 in the present case of a wedgelet-based coded coding block 104. For each depth_dc_abs indicating the absolute value of the additive prediction refinement of the predicted constant value $\hat{c}_a$ and $\hat{c}_b$, respectively, a sign flag is additionally contained in the data stream 120, namely depth_dc_sign_flag. Obviously, if the absolute value is 0, no sign value is needed. If, by definition, the sample values of block 104 are non-zero, the sign syntax elements may be left away. Further, a depth_dc_flag may alternatively be present for each wedgelet separately.

Accordingly, the decoder would obtain the constant value $c_a$ for filling or setting the sample values of the samples of wedgelet 108a and the constant value $c_b$ for filling or setting the sample values of the samples of wedgelet 108b, respectively, in the case of using the just listed syntax, by adding DcOffset to the respective predicted constant value $\hat{c}_a$ and $\hat{c}_b$. DcOffset is DcOffset[x0] [y0] [i]=(1−2*depth_dc_sign_flag[x0] [y0] [i])* (depth_dc_abs[x0] [y0] [i]−dcNumSeg+2)

As to how the samples belonging to each wedgelet are actually filled, may, however, also be performed in a different manner It should be noted that in all of the above described embodiments, there may be more than one wedgelet-based coding mode available. One of which may fill the samples within one wedgelet with a constant value transmitted—exemplarily predictively coded—via the respective syntax element structure 130/132, with one constant value per wedgelet, but another mode may fill the samples of each wedgelet with a linear function, i.e. linear with respect to the two-dimensional array of samples. Besides this, one or more non-wedgelet based coding modes may be available, too. For example, such modes may simply transmit a transform coefficient array for a coding block representing a spectral decomposition of the coding block's content.

Moreover, it should be noted that in all above embodiments, the coding block's 104 content may actually represent a prediction residual such as the prediction residual of a motion-compensated (temporal) and/or disparity-compensated (inter-view) prediction so that the decoder would add the reconstructed coding block's content to such a motion-compensated (temporal) and/or disparity-compensated (inter-view) prediction signal in order to obtain the reconstruction of the block's 104 content.

Accordingly, with respect to FIGS. 1 to 6, several embodiments of the present application for wedgelet-based coding of a coding block were explained, but it should be mentioned that these embodiments involved different details, which may be modified while still providing the advantages set out above in the introductory portion of the specification of the present application. Hereinafter, embodiments for an encoder and a decoder are described which, in accordance with an embodiment, may be implemented so as to be in line with the details described in the above identified embodiments, but may also be implemented differently, thereby generalizing the above embodiments.

Figure 7:
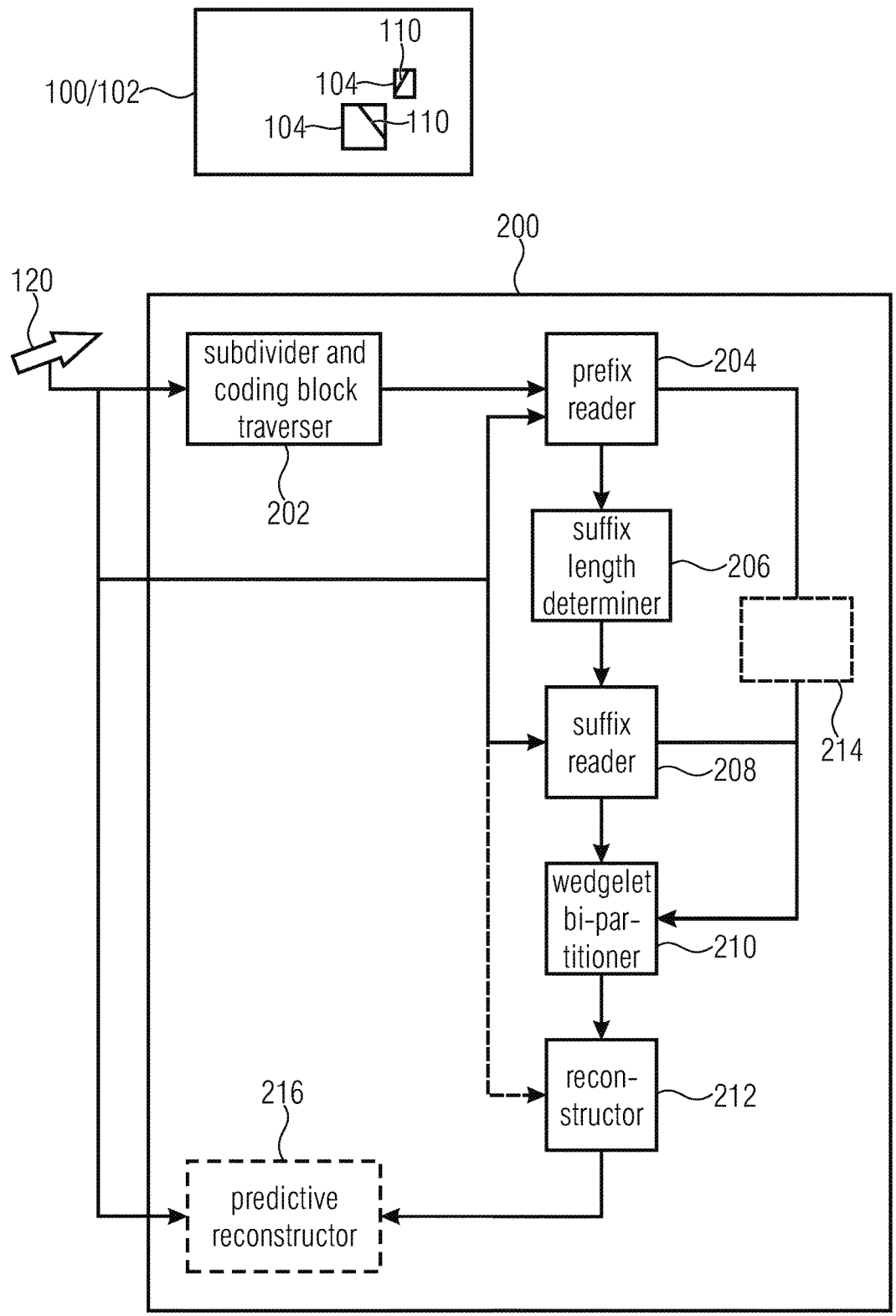
FIG. 7 shows a block diagram of a decoder in accordance with an embodiment of the present application.

FIG. 7, for example, shows a decoder 200 in accordance with an embodiment. The decoder 200 supports wedgelet based coding of coding blocks. As described above, coding blocks 104, with respect to which decoder 200 performs wedgelet-based decoding, may be all coding blocks or a subset of the coding blocks into which a picture or depth map 100/102 is partitioned, i.e. the may, if put together, completely cover picture or depth map 100/102 in spatial terms or not. The decoder 200 may, for example, optionally comprise a subdivider and coding block traverser 202 or means for subdividing the picture/depth map 100/102 into the coding blocks 104 and traversing the coding blocks 104, respectively. Block 202 may, for example, derive the subdivision of picture/depth map 100/102 into coding blocks 104 from subdivision information obtained from the data stream 120. Besides those coding blocks to be wedgelet-bi-partitioned as described further below, there may be other coding bocks to which another coding mode than the wegelet-bi-partitioning mode described next is assigned. Such other coding blocks, are, for example, coded in spectral domain via quantized transform coefficients such as coefficients of a DCT (Discrete Cosine Transform). For coding blocks to be wedgelet-based decoded, decoder 200 comprises, for example, a prefix reader 204, a suffix length determiner 206, a suffix reader 208, a wedgelet bi-partitioner 210 and a reconstructor 212. Blocks 204 to 212 are activated by block 202 for each currently coding block 104 which is to be wedgelet based decoded, for example. As described above, the coding blocks 104 to be wedgelet-based decoded may not completely cover picture 100 or depth map 102, respectively.

The prefix reader 204 acts as a means for reading the prefix 126 (see above) of the variable-length coded syntax element from data stream 120. As described above, the prefix reader 204 may be configured to read the prefix 126 from the data stream using a fixed bit-length which may be independent from the size of the current coding block and may be configured to read the bits of the prefix from the data stream directly, i.e. without any entropy decoding, or using fixed-equal-probability binary entropy decoding, i.e. using the same probability for each possible value of the prefix or for each bit of the prefix, respectively. Assume, for example, prefix 126 is a n-bit prefix having $2^n$ possible values which the prefix may assume. Then, the decoder could, for example, intermittently interrupt subdividing an internal arithmetic probability interval width so as to arithmetically decode further syntax elements, other than the prefix, but also participating in describing the picture/depth-map, from the data stream with the prefix reader reading the next n prefix bits in line from the data stream 120 directly, i.e. with leaving the internal arithmetic probability interval width unmodified or with merely modifying same independent from the prefix, or the prefix reader continues to divide, for example, an internal arithmetic probability interval width of the decoder for each of the n bits of the prefix so as to arithmetically decode the prefix from the data stream into which the other syntax elemnts have been entropy decoded as well, with halving the internal arithmetic probability interval width for each of the n bits and reading a bit from data stream to see as to which binary value the respective bit of the prefix has. This alleviates the reading task substantially compared to a context-based entropy coding. As also described above, the prefix reader 204 may read the prefix as a composition of a flag 126a indicating an approximate direction 112 of the wedgelet separation line 110 separating the two wedgelets as being primarily horizontal or primarily vertical, a sign 126b indicating a direction of an angular deviation of the approximate direction of the wedgelet separation line from an exactly horizontal or vertical extension, and an absolute value 126c indicating the magnitude of the angular deviation. That is, as described above, the flag 126a may indicate whether the angle between a horizontal axis and the wedgelet separation line is smaller than the angle between the wedgelet separation line and the vertical axis or vice versa. The angular deviation is, for example, measured clock-wise, and the sign thus indicates the direction of the angular deviation. The opposite may be true as well. However, this "structuring" of the fixed-length n-bit prefix into horizontal/vertical-flag, sign and m-bit absolute offset—with m=n−2—is merely optional and may be, in effect, interpreted as an example for a specific mapping of the n-bit/digit representation of the n-bit prefix onto the $2^n$ approximate wedglet separation line directions/slopes. Other mappings between the $2^n$ approximate wedglet separation line directions/slopes and the $2^n$ possible values which the n-bit prefix may assume, may be used as well.

Accordingly, as shown in FIG. 7, the decoder 200 may optionally comprise a wedgelet separation line direction determiner 214 or a means for determining an approximate direction of the wedgelet separation line on the basis of the prefix read by prefix reader 204.

The suffix length determiner 206 acts as a means for determining the suffix length measured, for example, in bits, wherein the determination is performed on the basis of the the prefix read by reader 204 and the size of the current coding block. As far as the suffix length determiner 206 is concerned, it should be clear that the suffix length determiner 206 may use the prefix for determining the length of the suffix 128 of the variable-length coded syntax element 124 directly or indirectly such as by determining the suffix length based on the approximate direction as determined by determiner 214. Generally, the determiner 206 is configured so that the length of suffix 228 increases with increasing coding block size. Further, the length of the suffix may tend to be smaller for prefixes corresponding to approximate directions nearby the exact horizontal or vertical extension. For example, for each coding block size, the suffix length determined by determiner 206 may be smallest for approximate directions parallel to, or at least similar to, the horizontal or vertical axis compared to the suffix length determined by determiner 206 for the respective coding block size for another wedgelet separation line approximate direction oblique to the horizontal and vertical axis, respectively, i.e. nearer to the diagonal (45°) directions. The advantage may be grasped from FIG. 9: The angular density of approximate directions/slopes distinguishable by the prefix may vary angularly. In the example of FIG. 9, the density is highest at horizontal and vertical directions, but this could be different in another embodiment. However, at such "high density directions", the number of reasonably distinguishable wedglet separation line positions (slope plus offset) is distributable/associatable onto a higher number of approximate slopes/directions. Accordingly, the number of suffix states of a certain prefix value identifying an approximate slope at or around such "high density direction", for distinguishing between respective wedglet separation line positions the slope of which is similar to the the certain prefix value's approximate slope, is reduced compared to prefix values identifying an approximate slope farther away—in angular terms—from the high density direction. By this measure, valuable bits of the data stream are spared.

The suffix reader 208 acts as a reader for reading the suffix of the variable-length coded syntax element from the data stream 120 by the use of the length determined by determiner 206. In other words, the suffix reader reads as many bits from the data stream as determined by suffix length determiner 206. As described above, even the suffix reader 208 may read bits of the suffix from the data stream 120 directly or by using fixed-equal-probability binary entropy decoding. Assume, for example, suffix is a m-bit prefix having $2^m$ possible values which the prefix may assume. Then, the decoder could, for example, intermittently interrupt subdividing an internal arithmetic probability interval width so as to arithmetically decode further syntax elements, other than the suffix, but also participating in describing the picture/depth-map, from the data stream with the suffix reader reading the next m prefix bits in line from the data stream 120 directly, i.e. with leaving the internal arithmetic probability interval width unmodified or with merely modifying same independent from the suffix, or the suffix reader continues to divide, for example, an internal arithmetic probability interval width of the decoder for each of the m bits of the suffix so as to arithmetically decode the suffix from the data stream into which the other syntax elements have been entropy decoded as well, with halving the internal arithmetic probability interval width for each of the m bits and reading a bit from data stream to see as to which binary value the respective bit of the suffix has.

The wedgelet bi-partitioner 210 acts as a means for determining the bi-partitioning of the current coding block into two wedgelets using the variable-length coded syntax element. That is, bi-partitioner 210 associates each sample of the coding block to either one of the two wedgelets in a manner so that the samples assigned to one of the two wegelets are positioned at one side of the wedgelet separation line the position of which is defined by prefix and suffix, and the samples assigned to the other one of the two wegelets are positioned at the opposite side of the wedgelet separation line. For example, the wedgelet bi-partitioner 210 is controlled by the suffix obtained by suffix reader 208 and the prefix read by prefix reader 204, namely directly or on the basis of the approximate direction of the wedgelet separation line as predetermined by determiner 214. As described above, a table lookup may be performed by bi-partitioner 210 using the prefix, either directly or the approximate direction determined therefrom, the suffix and the size of the current coding block as indices. The table entries may comprise binary-valued maps of the corresponding coding block size, thereby indicating a bi-partitioning of a coding block of that size along a wedgelet separation line corresponding to the respective prefix and suffix indexing, along with a coding block size, the respective table entry. As to how such a table may be built/construed has been exemplified above. Likewise, it was also already denoted above that that the wedgelet bi-partitioner may compute the bi-partitioning depending on the prefix, the suffix and the size of the current coding block on the fly, i.e. computationally.

Summarizing, the decoder according to FIG. 7 is such that prefix reader 204 reads the prefix 126 from the data stream using a fixed bit-length n which is independent from the size Z of the current coding block, the prefix indexing an approximate direction of a wedgelet separation line out of $2^n$ indexable approximate directions, and the wedgelet bi-partitioner is configured such that the two wedgelets 108a, 108b into which the current coding block 104 is bi-partitioned according to the variable-length coded syntax element 124 are separated along a line which has a slope which approximates the approximate direction indexed by the prefix, and which has an offset which depends on the suffix. The suffix length determiner 206 determined the length m of the suffix 128 of the variable-length coded syntax element 124 so that, for each of possible sizes of the current coding block 104, m is determined depending on the prefix so that m is minimum if the approximate direction out of $2^n$ indexable approximate directions, indexed by the prefix, corresponds to, or next to, a direction at which the $2^n$ indexable approximate directions have an angular local maximum density, and so that, for each of the $2^n$ possible values of the prefix, m is determined dependent on the size of the current coding block, so that m monotonically increases with an increasing size. As described above, the $2^n$ indexable approximate directions may have the angular local maximum density at horizontal and vertical direction. In even other words, Let P denote the prefix having n bits which indexes one of the $2^n$ indexable approximate directions or slopes $s[1] \ldots s[2^n]$ with $s[1]<s[2]<\ldots<s[2^n]$. Let S denote the suffix having bit length m. m is a function of, and varies in both, P and Z, i.e. m is m(P,Z) with Z denoting coding block size Z. Further, let $B_{P,S,Z}$ be the bi-partitioning used be the bi-partitioner for prefix P, suffix S and coding block size Z, i.e. $B_{P,S,Z}$ is a $L(Z) \times L(Z)$ binary coefficient matrix with binary coefficients $B_{P,S,Z}(x,y)$ with $0 \le x,y \le Z$ with $L_{(\ )}$ being some strictly monotonically increasing function such as an exponential or linear function. Let all possible coding block sizes Z be summarized in $\Omega_z$, with $\Omega_z$ denoting the set of possible coding block sizes. Then, each $B_{P,S,Z}$ divides the $L(Z) \times L(Z)$ block into two wedgelets along an actual wedgelet separation line having slope $s_{P,S,Z}$ and offset $o_{P,S,Z}$ (compare FIG. 2, showing such actual line 110). For example, the actual wedgelet separation line is a fit through the centers of samples of each wedgelet immediately neighboring the other wedgelet. Then, it holds true that there exists a local minimum P=i in the sequence of angular distances $\Delta\alpha[i]=s[i]-s[-1]$ for $i=2 \ldots 2^n$, i.e. an i for which $\Delta\alpha[i]<\Delta\alpha[i-1]$ and $\Delta\alpha[i]<\Delta\alpha[i+1]$ or $\Delta\alpha[i]=\Delta\alpha[i-1], \ldots, \Delta\alpha[i]=\Delta\alpha[i-p1]$ with $\Delta\alpha[i]=\Delta\alpha[i-p]$ and $\Delta\alpha[i]=\Delta\alpha[i-1], \ldots, \Delta\alpha[i]=\Delta\alpha[i+q-1]$ with $\Delta\alpha[i]=\Delta\alpha[i+q]$ for some p,q–(this is wedgeDir=8 and wedgDir=24 in FIG. 9) for which, for all coding blocks sizes $Z_e \in \Omega_Z$, $m[i,Z_e]=\min_P(\{P=1 \ldots 2^n | m[P,Z_e]\})$ (this is true for both wedDir=8 and wedgeDir=24 in the above exemplary table of wedgeDirTabIdxBits, i.e. wedgeDirTabIdxBits corresponding to wedDir=8 and wedgeDir=24 forms, in each line, the minimum). Further, for each $P_e=1 \ldots 2^n$, $m[P_e,1] \le m[P_e,2] \le \ldots \le m[P_e,\max(\Omega_Z)]$ (this is in each column of the table of wedgeDirTabIdxBits the values for wedgeDirTabIdxBits strictly montonically increase from top to bottom). As can be seen in the above table of wedgeDirTabIdxBits, m may be zero for some or one coding block sizes, for some, or one, approximate directions P, namely at or around the hight angular density direction(s) i.

Up to now, the only embodiments have been presented according to which the wedgelet separation line is straight and defined by slope and offset. The slope measures, for instance, the angle between a straight wedgelet separation line and the horizontal axis, and the offset measures, for instance, a translation of the wedgelet separation line along the horizontal and/or vertical axis relative to a position of the wedgelet separation line crossing the lower left hand corner of the current coding block, for instance.

However, as already denoted above, embodiments of the present application are not restricted to straight wedgelet separation lines. For example, the wedgelet separation lines able to be signaled via prefix and suffix may encompass curved wedgelet separation lines. In that case, the prefix may, for instance, still indicate/signal an appropriate direction of the wedgelet separation line, i.e. a mean slope of the wedgelet separation line within the current coding block. The suffix may the additionally define the curvature of the wedgelet separation line and any translation within the current coding block. Even here the suffix length may be dependent on the coding block size as well as the prefix in order to account for the different variability of the bi-partitioning resulting from varying curvature and translation at the respective approximate slope. Alternatively, the prefix also already distinguishes between some approximate curvatures of the wedgelet separation line with the suffix refining the wedgelet separation lines position in terms of mean slope, curvature, and translation. Again, the suffix length may advantageously be selected dependent on both the coding block size as well as the prefix value in order to account for the difference in the number of distinguishable bi-partitionings signalizable by the latter refinements. Other alternatives with respect to the wedgelet separation line may be feasible as well, such as examples where the wedgelet separation line is allowed to have a varying curvature along its extension.

The reconstructor 212 acts as a means for reconstructing the current coding block using the bi-partitioning a determined by wedgelet bi-partitioner 210. That is, the bi-partitioning as obtained by wedgelet bi-partitioner 210 associates each sample within the current coding block to either one of the two wedgelets within the current coding block. As described above, the reconstructor 212 may be configured to separately fill the sample values of the two wedgelets of the current coding block as determined by the bi-partitioning from bi-partitioner 210 with a constant value coded into the data stream. For example, predictive coding may have been used. That is, the reconstructor 212 may, for example, spatially predict the constant values for each of the two wedgelets of the current coding block and refine the predicted constant values thus obtained using syntax elements in the data stream 120 with filling the wedgelets using the refined constant values, respectively. Further details have been described above with respect to FIG. 6. However, other possibilities exist as well such as, for example, filling both wedgelets by temporal prediction, spatial extrapolation from neighboring already reconstructed sampled or the like. FIG. 7 illustrates that the decoder 200 may be a hybrid decoder configured to use the reconstruction of the current coding block as obtained by reconstructor 212 as a prediction residual of a motion and/or disparity compensated prediction signal. Accordingly, FIG. 7 shows that decoder 200 may optionally comprise a predictive reconstructor 216 which switches between different prediction modes such as motion-compensated, disparity and/or intra-prediction mode, in units of prediction blocks which may or may not coincide in block boundary with decoding blocks 104 so as to obtain a prediction signal for the picture 100 or depth map 102 with using the reconstruction of the current coding block as obtained by reconstructor 212 as a prediction residual of this prediction signal, namely for combining both in order to refine the prediction signal.

Further, as became clear from the above discussion, decoder 200 may be a motion video plus depth decoder and in that case the wedgelet-based coding mode as offered by blocks 204 to 212 discussed above may, for instance, only be used by decoder 200 as far as the decoding of the depth map is concerned with excluding this mode in decoding the texture of the picture 100. The blocks of decoder 200 shown in FIG. 7 may, for example, be different portions of a computer program implementing the decoder 200 by being run on a computer. A similar statement is true for FIG. 8.

Figure 8:
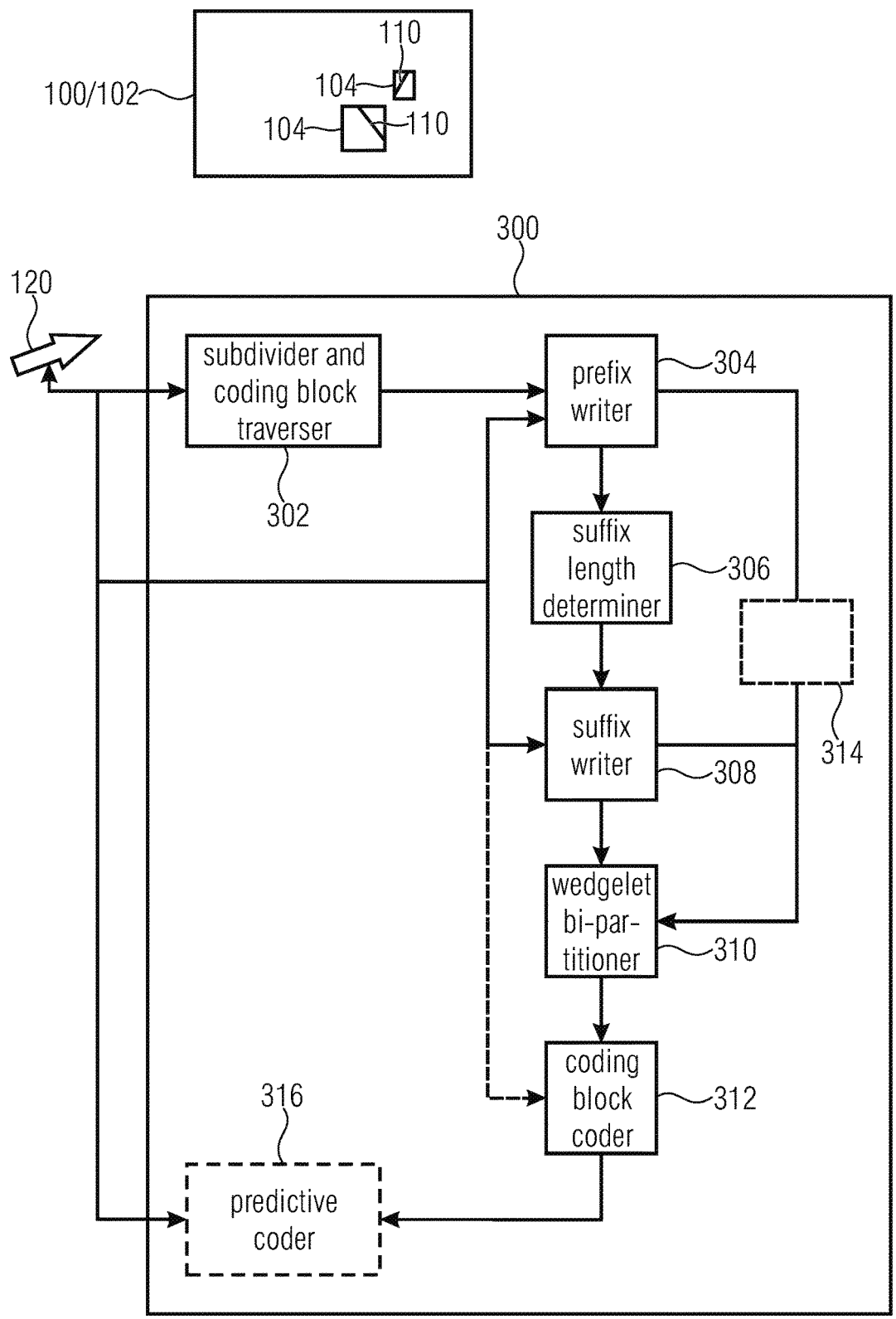
FIG. 8 shows a block diagram of an encoder according to an embodiment of the present application.

For the sake of completeness, FIG. 8 shows an encoder 300 fitting to the decoder 200 of FIG. 7. The reference sign used for indicating the blocks/elements of encoder 300 are similar to those assigned to the elements of the decoder of FIG. 7, merely deviating by the addition of 100. Accordingly, the encoder 300 of FIG. 8 comprises a subdivider and coding block traverser 302, a prefix writer 304, a suffix length determiner 306, a suffix writer 308, a wedgelet bi-partitioner 310, a coding block coder 312, an approximate direction determiner 314 and a predictive coder 316. Block 302 acts as block 202 with the difference being that, as far as encoder 300 is concerned, the subdivision is selected picture/depth map dependent by some optimization scheme. Likewise, blocks 304 to 312 substantially mirror the actions performed by blocks 204 to 212 for a current coding block with the difference being that that the syntax elements relating to that current coding block and controlling the wedgelet-based coding mode as discussed above are selected at the encoder side according to some optimization scheme. Accordingly, prefix writer 304 and suffix writer 308 write the respective prefix and suffix into the data stream 120 rather than reading same therefrom and the coding block coder 312 codes the actual filling of the samples within the wedgelets of the current coding block and to this end, may for example write the respective syntax elements such as the aforementioned constant value refinements, into the data stream 120. The predictive coder 316 likewise performs the hybrid prediction emulated by the predictive reconstructor 216, however with additionally selecting respective coding parameters for these prediction blocks by a respective optimization scheme and with, if present, using the version of the coding block as reconstructible from the data stream 120 on the basis of the syntax elements written into the data stream 120 by blocks 304 to 312 as a prediction residual as described previously. In other words, the analysis-by-synthesis nature of encoder 300 involves that the encoder renders the reconstructable version of the picture/depth-map available for the further predictions, for example, performed by predictive coder 316. Accordingly, the encoder 300 may be an MVD encoder and with respect to all of the other details which may be used to further implement the encoder 300 of FIG. 8, reference is made to the above discussion with respect to the decoder side.

Embodiments described above may, inter alias, be used to modify the DMM1 wedgelet mode of HTM-9.0 of the HEVC extension at the time prior to the priority date of the present application. In that case, the modified signaling of DMM1 wedgelet patterns would be based on the 32 directions of the angular intra mode. The scheme of fixed length CABAC binarization of the wedgelet pattern list index would be replaced by a binarization that uses bypass coding. The resulting modified scheme would signal the direction of the wedgelet separation line plus a refinement index.

In particular, in HTM-9.0 the wedgelet pattern of DMM1 is signaled as an index in the wedgelet pattern list corresponding to the block size. This index is binarized by fixed length coding with one CABAC context. This solution cannot benefit from CABAC context adaptation very well. A binarization scheme for signaling the DMM1 wedgelet segmentation pattern information as it would result by designing same according to the above embodiments would, however, be based on the 32 directions of angular intra mode and use bypass instead of CABAC context coding.

In a concrete example, exploiting the advantage of the above embodiments, the concept of DMM1 coding would, for example, operate as follows: in a first step the intra direction corresponding to the direction of the wedgelet separation line is signaled. For this purpose the slope of the wedgelet line is mapped to one of the 32 directions defined for the angular intra mode during wedgelet pattern list initialization. Given the direction of a DMM1 block, the binarization works as follows: A flag is sent, specifying whether the direction is in the horizontal or vertical domain (H or V in FIG. 9). The direction offset of the slope to either HOR_IDX (10) or VER_IDX (26) is signaled as sign (+or −in FIG. 9) and absolute value absVal (0 to 7 in FIG. 9) using 1 and 3 bypass coded bins, respectively. From these three elements the direction dir (which corresponds to wedgeDir-2 and has a value range of 2 . . . 34) is calculated as dir=((flag)? 10:26)+((sign)? −1:1)*absVal−sign.

In a second step the refinement index idx in a direction-dependent wedgelet list is signaled using N bypass coded bins. The number of bins N depends on the length of the predefined list for each direction and block size. At the decoder the wedgelet pattern used for reconstruction of the DMM1 block is consequently defined as a lookup in the array of direction-dependent wedgelet lists wDirLists as pattern=wDirLists[dir−2] [idx].

According to the CE5 description in JCT3V-F1105 and the common test conditions in JCT3V-F1100 [2]0, this modified DMM1 scheme has been evaluated for random access (CTC) and all-intra configuration with HTM-9.0r1. The result is summarized in the following tables.

TABLE

Result for 3-view scenario under CTC

| | video PSNR/ video bitrate | video PSNR/ total bitrate | synth PSNR/ total bitrate | enc time | dec time | ren time |
|---|---|---|---|---|---|---|
| Balloons | 0.0% | 0.0% | −0.02% | 100.6% | 102.3% | 99.3% |
| Kendo | −0.1% | −0.1% | −0.17% | 99.8% | 97.9% | 101.3% |
| Newspapercc | 0.0% | −0.1% | −0.11% | 100.0% | 101.1% | 99.0% |
| GhostTown-Fly | 0.0% | 0.0% | −0.08% | 99.7% | 97.2% | 102.0% |
| PoznanHall2 | 0.0% | −0.1% | −0.01% | 98.6% | 100.8% | 97.2% |
| PoznanStreet | 0.0% | 0.0% | −0.04% | 99.9% | 97.8% | 101.2% |
| UndoDancer | 0.0% | 0.0% | −0.07% | 99.2% | 102.3% | 100.0% |
| Shark | 0.0% | 0.0% | −0.03% | 99.7% | 92.0% | 98.0% |
| 1024 x 768 | 0.0% | −0.1% | −0.10% | 100.1% | 100.4% | 99.9% |
| 1920 x 1088 | 0.0% | 0.0% | −0.05% | 99.4% | 98.0% | 99.7% |
| average | 0.0% | 0.0% | −0.07% | 99.7% | 98.9% | 99.8% |

TABLE

Result for 3-view scenario under all-intra configuration

| | video PSNR/ video bitrate | video PSNR/ total bitrate | synth PSNR/ total bitrate | enc time | dec time | ren time |
|---|---|---|---|---|---|---|
| Balloons | 0.0% | 0.0% | −0.05% | 99.1% | 98.7% | 100.6% |
| Kendo | 0.0% | 0.0% | −0.10% | 99.7% | 99.8% | 98.1% |
| Newspapercc | 0.0% | 0.0% | −0.10% | 99.9% | 99.7% | 99.7% |
| GhostTown-Fly | 0.0% | 0.0% | −0.06% | 99.4% | 95.4% | 100.4% |
| PoznanHall2 | 0.0% | 0.0% | −0.12% | 99.0% | 102.7% | 97.1% |
| PoznanStreet | 0.0% | 0.0% | −0.04% | 99.9% | 99.2% | 100.8% |
| UndoDancer | 0.0% | 0.0% | −0.08% | 99.5% | 103.2% | 100.7% |
| Shark | 0.0% | 0.0% | 0.00% | 99.9% | 95.3% | 98.3% |
| 1024 x 768 | 0.0% | 0.0% | −0.08% | 99.6% | 99.4% | 99.5% |
| 1920 x 1088 | 0.0% | 0.0% | −0.06% | 99.5% | 99.2% | 99.5% |
| average | 0.0% | 0.0% | −0.07% | 99.5% | 99.2% | 99.5% |

The modification involved changing the specification in Annex H of JCT3V-F1001 [3]. Possible changes may be derived from the description above and possible fragments for amending the specification have also been shown above.

The results of the latter tables show that the modified binarization scheme for DMM1 Wedgelet segmentation pattern information leads to a coding gain of about 0.1%. The coding performance is improved for all sequences with CTC as well as all-intra configuration. At the same time the proposed method reduces the number of CABAC coded bins to zero and does not lead to a higher complexity.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A decoder supporting wedgelet-based decoding of coding blocks, comprising:
   a prefix reader configured to read, for a current coding block, a prefix of a variable-length coded syntax element from a data stream;
   a suffix length determiner configured to determine a length of a suffix of the variable-length coded syntax element based on the prefix and a size of the current coding block, wherein for each possible value of the prefix, the length of the suffix increases with an increasing size of the current coding block;
   a suffix reader configured to read, using the length determined, the suffix of the variable-length coded syntax element from the data stream;
   a wedgelet bi-partitioner configured to determine a bi-partitioning of the current coding block into two wedgelets using the prefix and the suffix of the variable-length coded syntax element; and
   a reconstructor configured to reconstruct the current coding block using the bi-partitioning.

2. The decoder according to claim 1, wherein the prefix reader is configured to read the prefix from the data stream using a fixed bit-length which is independent from the size of the current coding block.

3. The decoder according to claim 1, wherein the prefix reader is configured to read all bits of the prefix from the data stream directly or using fixed-equal-probability binary entropy decoding.

4. The decoder according to claim 1, wherein the suffix reader is configured to read all bits of the suffix from the data stream directly or using fixed-equal-probability binary entropy decoding.

5. The decoder according to claim 1, wherein the prefix reader is configured to read the prefix as a composition of
   a flag indicating an approximate direction of a wedgelet separation line separating the two wedgelets as being primarily horizontal or primarily vertical,
   a sign indicating a direction of an angular deviation of the approximate direction of the wedgelet separation line from an exactly horizontal or vertical extension, and
   an absolute value indicating a magnitude of the angular deviation.

6. The decoder according to claim 5, wherein the decoder comprises a wedgelet separation line direction determiner configured to determine an approximate direction of the wedgelet separation line from the prefix, wherein the suffix length determiner, the wedgelet bi-partitioner or both the suffix length determiner and the wedgelet bi-partitioner is/are configured to use the approximate direction of the wedgelet separation line for its determination.

7. The decoder according to claim 1, wherein the prefix reader is configured to read the prefix from the data stream using a fixed bit-length n which is independent from the size of the current coding block, the prefix indexing an approximate direction of a wedgelet separation line out of $2^n$ indexable approximate directions, and the wedgelet bi-partitioner is configured such that the two wedgelets into which the current coding block is bi-partitioned according to the variable-length coded syntax element are separated along a line which comprises a slope which approximates the approximate direction indexed by the prefix, and which comprises an offset which depends on the suffix.

8. The decoder according to claim 7, wherein the suffix length determiner is configured to determine the length m of the suffix of the variable-length coded syntax element so that, for each of possible sizes of the current coding block, m is minimum if the approximate direction out of $2^n$ indexable approximate directions corresponds to, or next to, a direction at which the $2^n$ indexable approximate directions comprise an angular local maximum density.

9. The decoder according to claim 8, wherein the suffix length determiner is configured such that the $2^n$ indexable approximate directions comprise an angular local maximum density at horizontal and vertical direction.

10. The decoder according to claim 8, wherein the suffix length determiner is configured such that m equals zero for a subset of the possible sizes and a subset proximate directions out of the $2^n$ indexable approximate directions.

11. The decoder according to claim 1, wherein the wedgelet bi-partitioner is configured to determine the bi-partitioning by performing a table look up using the prefix, the suffix and the size of the current coding block as indices.

12. The decoder according to claim 1, wherein the decoder is a hybrid decoder configured to use the reconstruction of the current coding block as prediction residual of a prediction signal.

13. The decoder according to claim 1, wherein the decoder is a hybrid decoder configured to use the reconstruction of the current coding block as prediction residual of a motion- and/or disparity-compensated prediction signal.

14. The decoder according to claim 1, wherein the coding blocks are coding blocks of a depth map.

15. The decoder according to claim 1, wherein the decoder is a MVD (multiview video plus depth) decoder.

16. The decoder according to claim 1, wherein the reconstructor is configured to spatially predict predicted constant values for each of the two wedgelets, refine the predicted constant values using syntax element structures in the data stream, and fill the wedgelets using the refined constant values.

17. The decoder according to claim 16, wherein the decoder is configured to spatially predict the predicted constant values using already decoded samples neighboring the current coding block.

18. A method comprising:
   reading, for a current coding block, a prefix of a variable-length coded syntax element from a data stream;
   determining a length of a suffix of the variable-length coded syntax element based on the prefix and a size of the current coding block, wherein for each possible value of the prefix, the length of the suffix increases with an increasing size of the current coding block;
   reading, using the length determined, the suffix of the variable-length coded syntax element from the data stream;
   determining a bi-partitioning of the current coding block into two wedgelets using the prefix and the suffix of the variable-length coded syntax element; and
   reconstructing the current coding block using the bi-partitioning.

19. An encoder supporting wedgelet-based encoding of coding blocks, the encoder being configured to select for a current coding block a variable-length coded syntax element according to an optimization scheme, the encoder comprising:
- a prefix writer configured to write, for the current coding block, a prefix of the variable-length coded syntax element to a data stream;
- a suffix length determiner configured to determine a length of a suffix of the variable-length coded syntax element based on the prefix and a size of the current coding block, wherein for each possible value of the prefix, the length of the suffix increases with an increasing size of the current coding block;
- a suffix writer configured to write, using the length determined, the suffix of the variable-length coded syntax element to the data stream;
- a wedgelet bi-partitioner configured to determine a bi-partitioning of the current coding block into two wedgelets using the prefix and the suffix of the variable-length coded syntax element; and
- a coder configured to code the current coding block using the bi-partitioning.

20. A method comprising:
- selecting, for a current coding block, a variable-length coded syntax element according to an optimization scheme;
- writing, for the current coding block, a prefix of the variable-length coded syntax element to a data stream;
- determining a length of a suffix of the variable-length coded syntax element based on the prefix and a size of the current coding block, wherein for each possible value of the prefix, the length of the suffix increases with an increasing size of the current coding block;
- writing, using the length determined, the suffix of the variable-length coded syntax element to the data stream;
- determining a bi-partitioning of the current coding block into two wedgelets using the prefix and the suffix of the variable-length coded syntax element; and coding the current coding block using the bi-partitioning.

21. A non-transitory digital storage medium having a computer program stored thereon to perform the method of:
- reading, for a current coding block, a prefix of a variable-length coded syntax element from a data stream;
- determining a length of a suffix of the variable-length coded syntax element based on the prefix and a size of the current coding block, wherein for each possible value of the prefix, the length of the suffix increases with an increasing size of the current coding block;
- reading, using the length determined, the suffix of the variable-length coded syntax element from the data stream;
- determining a bi-partitioning of the current coding block into two wedgelets using the prefix and the suffix of the variable-length coded syntax element; and
- reconstructing the current coding block using the bi-partitioning when said computer program is run by a computer.

22. A non-transitory digital storage medium having a computer program stored thereon to perform the method of:
- selecting, for a current coding block, a variable-length coded syntax element according to an optimization scheme;
- writing, for the current coding block, a prefix of the variable-length coded syntax element to a data stream;
- determining a length of a suffix of the variable-length coded syntax element based on the prefix and a size of the current coding block, wherein for each possible value of the prefix, the length of the suffix increases with an increasing size of the current coding block;
- writing, using the length determined, the suffix of the variable-length coded syntax element to the data stream;
- determining a bi-partitioning of the current coding block into two wedgelets using the prefix and the suffix of the variable-length coded syntax element; and
- coding the current coding block using the bi-partitioning when said computer program is run by a computer.

* * * * *